(12) United States Patent
Evens et al.

(10) Patent No.: US 9,017,499 B2
(45) Date of Patent: *Apr. 28, 2015

(54) BONDED PATCHES WITH BOND LINE CONTROL

(75) Inventors: Michael W. Evens, Burien, WA (US); David M. Anderson, Sammamish, WA (US); Steve Blanchard, Issaquah, WA (US); Aydin Akdeniz, Langley, WA (US); John Spalding, Renton, WA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 12/613,810

(22) Filed: Nov. 6, 2009

(65) Prior Publication Data

US 2010/0276065 A1   Nov. 4, 2010

Related U.S. Application Data

(63) Continuation-in-part of application No. 12/328,903, filed on Dec. 5, 2008, now Pat. No. 8,734,604, and a continuation-in-part of application No. 12/554,554, filed on Sep. 4, 2009, now Pat. No. 8,795,455.

(51) Int. Cl.
| | |
|---|---|
| *B29C 73/10* | (2006.01) |
| *B29C 65/52* | (2006.01) |
| *B29C 65/78* | (2006.01) |
| *B29C 65/00* | (2006.01) |
| *B29C 73/12* | (2006.01) |
| *B29C 73/24* | (2006.01) |
| *B29C 65/48* | (2006.01) |

(Continued)

(52) U.S. Cl.
CPC ............... *B29C 73/10* (2013.01); *B29C 35/02* (2013.01); *B29C 65/524* (2013.01); *B29C 65/7826* (2013.01); *B29C 65/7829* (2013.01); *B29C 66/45* (2013.01); *B29C 66/721* (2013.01); *B29C 73/12* (2013.01); *B29C 73/24* (2013.01); *B29K 2105/06* (2013.01); *B29K 2105/16* (2013.01); *B29L 2031/3076* (2013.01); *B29C 65/526* (2013.01); *B29C 66/472* (2013.01); *B29C 65/4835* (2013.01); *B29C 65/48* (2013.01); *B29C 65/483* (2013.01); *B29C 65/4875* (2013.01)

(58) Field of Classification Search
None
See application file for complete search history.

(56) References Cited

U.S. PATENT DOCUMENTS

| | | | |
|---|---|---|---|
| 1,881,651 | A | 10/1932 | Judge |
| 2,795,854 | A | 6/1957 | Perkal |

(Continued)

FOREIGN PATENT DOCUMENTS

| | | |
|---|---|---|
| DE | 29709179 U1 | 7/1997 |
| GB | 154193 A | 7/1921 |

(Continued)

OTHER PUBLICATIONS

International Search Report, dated Nov. 22, 2010, regarding Application No. PCT/US2010/044423 (WO2011028355), 3 pages.

(Continued)

*Primary Examiner* — Barbara J Musser
(74) *Attorney, Agent, or Firm* — Yee & Associates, P.C.

(57) ABSTRACT

A patch is used to rework an area of a structure. The patch is bonded to the structure by a layer of adhesive. A spacer placed between the patch and the structure is used to control the thickness of the adhesive and/or a bondline.

16 Claims, 16 Drawing Sheets

(51) Int. Cl.
| | |
|---|---|
| B29C 35/02 | (2006.01) |
| B29K 105/06 | (2006.01) |
| B29K 105/16 | (2006.01) |
| B29L 31/30 | (2006.01) |

(56) References Cited

U.S. PATENT DOCUMENTS

| | | | |
|---|---|---|---|
| 3,046,670 | A | 7/1962 | Wydra |
| 3,389,474 | A | 6/1968 | Linn |
| 3,924,529 | A | 12/1975 | Atkinson |
| 4,874,648 | A * | 10/1989 | Hill et al. ............ 428/35.9 |
| 5,023,987 | A | 6/1991 | Wuepper et al. |
| 5,214,307 | A | 5/1993 | Davis |
| 5,232,962 | A | 8/1993 | Dershem et al. |
| 5,269,861 | A | 12/1993 | Gilbreath |
| 5,620,768 | A | 4/1997 | Hoffmann, Sr. |
| 5,833,795 | A * | 11/1998 | Smith et al. ........... 156/272.4 |
| 5,865,397 | A | 2/1999 | Herrmann |
| 5,925,204 | A | 7/1999 | Hoffmann, Sr. |
| 5,958,166 | A | 9/1999 | Walters et al. |
| 6,073,577 | A | 6/2000 | Lilleland et al. |
| 6,124,016 | A * | 9/2000 | Weil .................. 428/99 |
| 6,286,224 | B1 | 9/2001 | Lewis |
| 6,472,758 | B1 | 10/2002 | Glenn et al. |
| 6,889,442 | B2 | 5/2005 | Bouvier |
| 6,904,690 | B2 | 6/2005 | Bakke et al. |
| 7,229,683 | B2 | 6/2007 | Fischer et al. |
| 7,306,851 | B2 | 12/2007 | Panse |
| 7,350,311 | B2 | 4/2008 | Marks |
| 7,495,862 | B2 | 2/2009 | Flores et al. |
| 7,575,778 | B2 | 8/2009 | Su et al. |
| 7,686,905 | B2 | 3/2010 | Ackerman et al. |
| 8,109,312 | B2 | 2/2012 | Schober |
| 2003/0005995 | A1 | 1/2003 | Miller |
| 2004/0113483 | A1* | 6/2004 | Sylvester et al. ......... 301/37.11 |
| 2004/0187331 | A1 | 9/2004 | Bouvier |
| 2005/0022923 | A1 | 2/2005 | Korchnak et al. |
| 2005/0051360 | A1 | 3/2005 | Su et al. |
| 2005/0112968 | A1 | 5/2005 | Panse |
| 2005/0272142 | A1* | 12/2005 | Horita ................ 435/287.1 |
| 2006/0176611 | A1* | 8/2006 | Flores et al. ........... 360/99.08 |
| 2007/0095457 | A1* | 5/2007 | Keller et al. ............ 156/94 |
| 2009/0139638 | A1* | 6/2009 | Flores et al. ........... 156/210 |
| 2009/0165928 | A1 | 7/2009 | Schober |
| 2010/0143722 | A1 | 6/2010 | Anderson et al. |
| 2010/0276064 | A1 | 11/2010 | Blanchard et al. |
| 2012/0111478 | A1 | 5/2012 | Akdeniz et al. |
| 2012/0137532 | A1 | 6/2012 | Yeh |

FOREIGN PATENT DOCUMENTS

| | | |
|---|---|---|
| GB | 746331 A | 3/1956 |
| GB | 2155637 A | 9/1985 |
| WO | 2009080038 A1 | 7/2009 |
| WO | 2011028355 A1 | 3/2011 |

OTHER PUBLICATIONS

USPTO Office Action, dated Jan. 14, 2011, regarding U.S. Appl. No. 12/328,903, 14 pages.
Response to Office Action, dated May 9, 2011, regarding U.S. Appl. No. 12/328,903, 24 pages.
USPTO Final Office Action, dated Jun. 8, 2011, regarding U.S. Appl. No. 12/328,903, 12 pages.
Response to Final Office Action, dated Sep. 30, 2011, regarding U.S. Appl. No. 12/328,903, 24 pages.
USPTO Advisory Action, dated Nov. 8, 2011, regarding U.S. Appl. No. 12/328,903, 6 pages.
USPTO Office Action, dated Jan. 13, 2011, regarding U.S. Appl. No. 12/554,554, 14 pages.
Response to Office Action, dated Apr. 7, 2011, regarding U.S. Appl. No. 12/554,554, 21 pages.
USPTO Office Action dated, Jun. 30, 2011, regarding U.S. Appl. No. 12/554,554, 11 pages.
Response to Office Action, dated Sep. 30, 2011, regarding U.S. Appl. No. 12/554,554, 22 pages.
International Search Report, dated Feb. 6, 2012, regarding Application No. PCT/US2011/053402 (WO2012060944), 6 pages.
Greene, "Chapter Five: Fabrication—Repair," In: Marine Composites, Eric Greene Associates, Inc., Annapolis, MD, Jul. 1999, pp. 285-299.
Notice of Allowance, dated Oct. 21, 2013, regarding U.S. Appl. No. 13/897,526, 17 pages.
Notice of Allowance, dated Jan. 9, 2014, regarding U.S. Appl. No. 12/328,903, 5 pages.
Notice of Allowance, dated Feb. 25, 2013, regarding U.S. Appl. No. 12/939,485, 5 pages.
Office Action, dated Nov. 2, 2012, regarding U.S. Appl. No. 12/939,485, 19 pages.
Office Action, dated Dec. 21, 2012, regarding U.S. Appl. No. 12/328,903, 23 pages.
Notice of Allowance, dated Mar. 26, 2014, regarding U.S. Appl. No. 12/554,554, 11 pages.
Canadian Patent Office Examination Report, dated Jan. 29, 2015, regarding Application No. CA2771270, 3 pages.

* cited by examiner

BONDED PATCHES WITH BOND LINE CONTROL

CROSS REFERENCE TO RELATED APPLICATIONS

This application is a continuation-in-part of U.S. patent application Ser. No. 12/328,903 filed Dec. 5, 2008, now U.S. Pat. No. 8,734,604 and Ser. No. 12/554,554 filed Sep. 4, 2009, now U.S. Pat. No. 8,795,455 the entire disclosures of which are incorporated by reference herein.

TECHNICAL FIELD

The present disclosure generally relates to bonding equipment and processes, and deals more particularly with a method and apparatus for reworking structures using bonded patches.

BACKGROUND

Adhesives may be used to bond parts and structures in a wide variety of applications. In the aircraft industry, for example, adhesives may be used to bond patches to a structure such as a skin panel in order to improve, rework and/or repair an area of the structure. In some cases, the patch and/or the structure may be formed of composite materials. After applying a layer of adhesive to the structure and/or the patch, pressure along with heat is applied to the patch in order to cure the adhesive and form a strong bond at the patch and structure. This bonding process is not easily performed in the field, and may therefore be normally carried out under controlled conditions such as, without limitation, within a maintenance/repair hanger facility where specialized handling equipment and skilled technicians with knowledge of composites are available.

The strength and/or longevity of a bonded patch may depend in part on the thickness of the adhesive, the evenness of the adhesive thickness over the area of the patch and/or the presence of voids or air pockets between the patch and the structure caused by, without limitation, porosity in the bond. Bond line thickness and porosity may be controlled to some degree by controlling the pressure that is applied to the patch during its installation. However, determining the exact pressure necessary to achieve a particular bond line thickness maybe difficult, and in any event, applying this exact pressure uniformly across the patch may be challenging. Film type adhesives of constant thickness represent one possible solution to the problems discussed above, however the use of film adhesives may not be practical in some applications because of the special handling that they may require, such as, without limitation, the need to refrigerate the film until it is ready for use.

Accordingly, there is a need for a method of bonding a patch to a structure that allows close control of bond line thickness over substantially the entire area of the patch, and which reduces or eliminates porosity in the bond due to voids. There is also a need for a method of bonding patches to structures that may be carried out in the field, using an adhesive that does not require special handling, is not highly dependent on an installer's skill and which yields consistent, repeatable results.

SUMMARY

In accordance with the disclosed embodiments, a method is provided for bonding patches on structures in which the bond line or thickness of the bonding adhesive may be controlled over substantially the entire area of the patch. The method may not require a high level of installer skill and may provide consistent, repeatable results, even when performed in the field. A spacer is used to aid in allowing adhesive to be applied uniformly over the area of the patch and to a desired thickness. In one embodiment, the spacer is placed between the patch and the structure. Optionally, the spacer may be removed after the adhesive is applied, or be left between the patch and the structure in order to limit compaction of the adhesive and thereby maintain a desired bondline thickness as the patch is being compacted and cured. In another embodiment, the spacer forms part of the tooling used to compact the patch against the structure. Perforations may be optionally provided in the patch to reduce or eliminate porosity in the bond by allowing air and/or excess adhesive to escape from the patch as it is forced against a structure during a patching operation. Patch installation may be carried out relatively quickly in the field using a set of prepackaged, preconfigured components.

According to one disclosed embodiment, a method is provided for reworking an area of a structure, comprising preparing a patch and placing a layer of viscous bonding adhesive between the structure and the patch. A spacer is used to control the thickness of the adhesive layer. The patch is compacted against structure. Using the spacer includes placing the spacer on one of the patch and the structure, and placing a layer of viscous bonding adhesive includes applying the adhesive to one of the patch and the structure through the spacer. The method may further comprise removing the spacer from one of the patch and the structure before the patch is compacted against the structure. Using the spacer may also include placing the spacer between the patch and the structure to limit compaction of the adhesive as the patch is compacted against the structure.

According to another disclosed embodiment, a method is provided of bonding a patch on a structure. The method includes placing a spacer on one of the patch and the structure and applying a layer of viscous bonding adhesive to one of the patch and the structure. Application of the adhesive may include using the spacer to control the thickness of the adhesive layer as the adhesive is being applied. The method further includes placing the patch on the structure with the adhesive layer therebetween, compacting the patch against the structure, and curing the adhesive. The method may also include using the spacer to limit the compaction of the adhesive layer to a preselected thickness as the patch is compacted against the structure. The spacer may be removed after the layer of adhesive has been applied.

According to a further disclosed embodiment, a kit is provided for reworking an area of a structure. The kit includes a patch adapted to overlie the rework area and be compacted against the structure, and a viscous adhesive for bonding the patch member to the structure. A spacer is also provided for controlling the thickness of a layer of the adhesive used to bond the patch to the structure. The patch may be a cured fiber reinforced polymer composite.

In accordance with a further embodiment, a composite patch is provided for use in reworking a section of a structure. The composite patch includes a face adapted to be bonded to the structure by a layer of adhesive placed between the patch and the structure. The patch has a plurality of spacer elements distributed across the face and formed integral with the patch for controlling the thickness of the adhesive layer.

The disclosed embodiments satisfy the need for a method and apparatus for adhesively bonding a patch on a structure that may be carried out relatively quickly, and allow close control over bond line thickness while reducing or eliminating porosity in the bond.

The features, functions, and advantages can be achieved independently in various embodiments of the present disclosure or may be combined in yet other embodiments in which further details can be seen with reference to the following description and drawings.

BRIEF DESCRIPTION OF THE ILLUSTRATIONS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
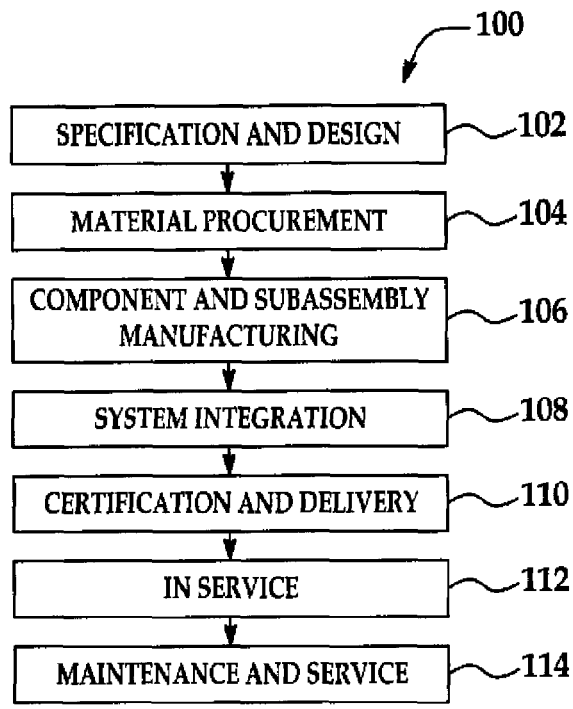
FIG. 1 is an illustration of a diagram showing an aircraft manufacturing and service method in accordance with an advantageous embodiment.
Figure 2:
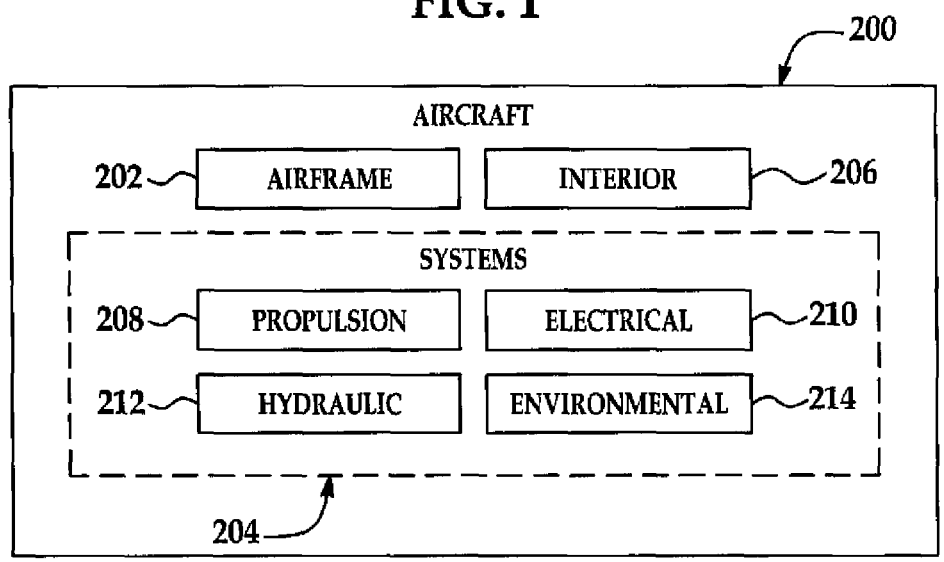
FIG. 2 is an illustration of a diagram showing an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, without limitation, advantageous embodiments may be used to join parts for aircraft 200 during component and subassembly manufacturing 106 and/or system integration 108 of aircraft 200. Additionally, advantageous embodiments may be employed during maintenance and service 114 to perform reconfigurations and/or repairs of aircraft 200.

The different advantageous embodiments recognize and take into account that current processes for applying adhesive may not result in an even layer of adhesive being applied to an area in which bonding is to be performed. The different advantageous embodiments also recognize and take into account that the current processes may not provide a desired thickness for the adhesive layer even if the adhesive can be applied to form an even layer.

Figure 2A:
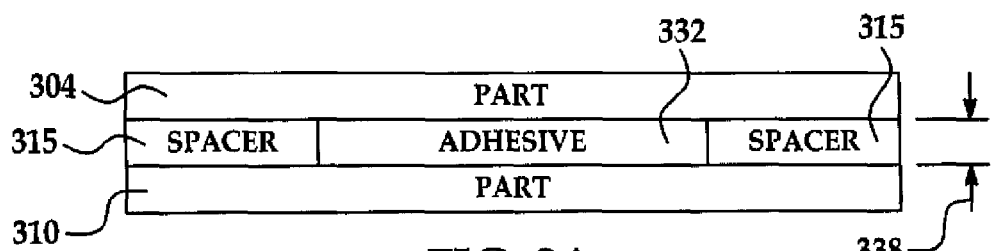
FIG. 2A is an illustration of a functional block diagram showing the use of a spacer to maintain a desired bondline thickness between two adhesively bonded parts.

Referring to FIG. 2A, in accordance with the disclosed embodiments, a method is provided for bonding parts 304, 310 together using a layer of bonding adhesive 332 applied to one or to both of the parts 304, 310. The thickness 338 of the adhesive 332, sometimes also referred to herein as a "bondline", maybe controlled by placing one or more spacers 315 between the parts 304, 310. As will be described below, various forms of the spacers 315 are possible. In one embodiment, a spacer 315 is employed to apply a uniform layer of adhesive 332 of substantially constant thickness 338 to one or both of the parts 304, 310, and is removed before the parts 304, 310 are bonded together. In other embodiments, the spacer 315 may remain between the parts 304, 310 to aid in maintaining a constant bondline thickness 338 as the parts 302, 310 are compacted together. In effect, the spacer 315 limits compaction of the adhesive 332 as the parts 304, 310 are being compacted.

Figure 3:
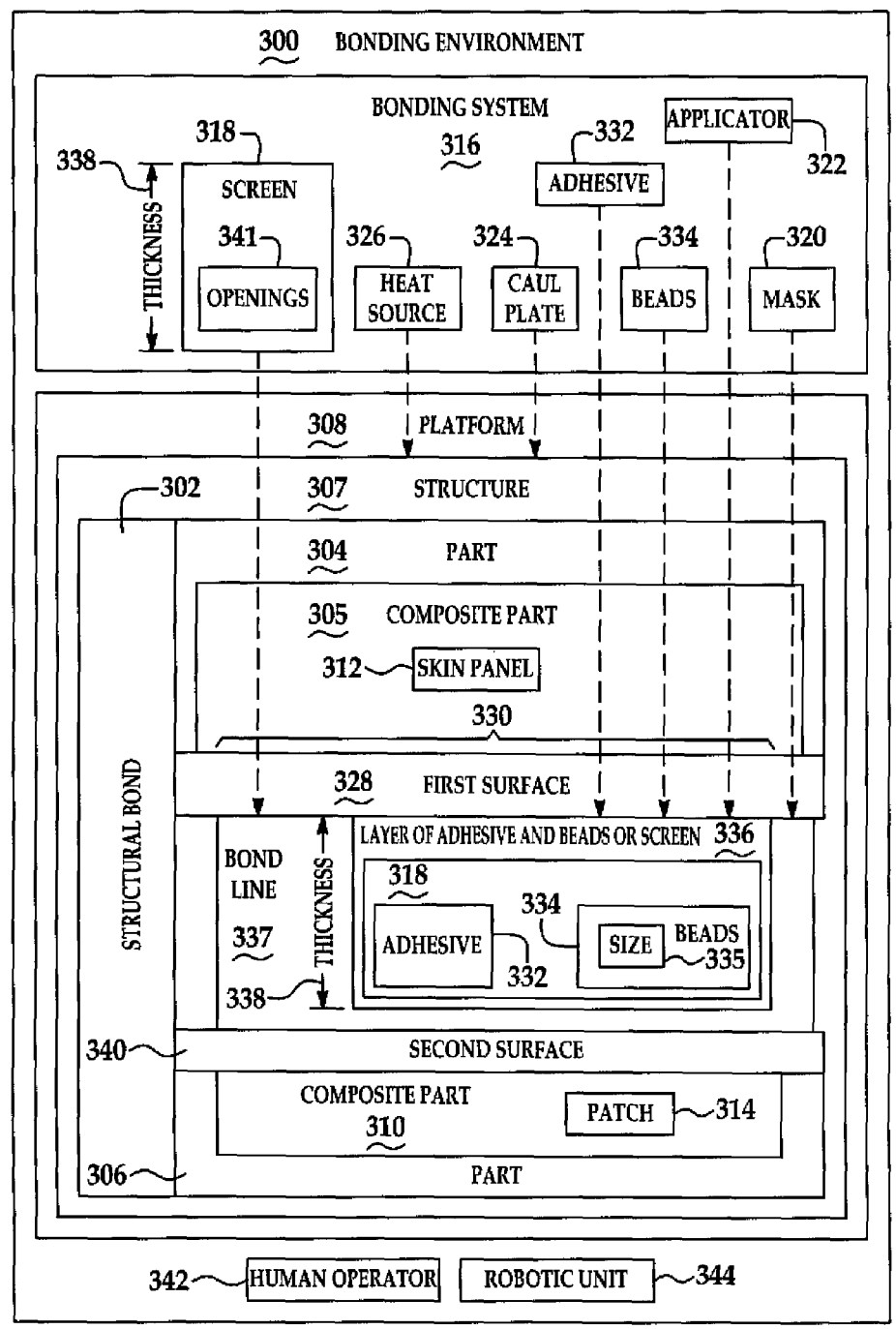
FIG. 3 is an illustration of a diagram showing a bonding environment in accordance with an advantageous embodiment.

Referring to FIG. 3, in one embodiment, the spacer 315 may comprise a screen 318 and/or beads 334 mixed into the adhesive 332. The adhesive 332 and a plurality of the beads 334 are applied onto a surface 328 of a first part 304 through the screen 318 to form a layer 336 of adhesive 332 and beads 334. The surface 328 of the first part 304 with the layer 336 of adhesive 332 and beads 334 is placed into contact with the surface 340 of the second part 310 to form an adhesive layer 336 containing beads 334 to form a structure 307. The structure 307 may then be cured.

In these examples, the screen 318 may have a thickness, and applying the adhesive 332 and the plurality of beads 334 onto a first surface 328 of the first part 304 through the screen 318 may result in the layer 336 of adhesive 332 and beads 334 having substantially the thickness 338 of the screen 318.

The plurality of beads 334 may have a size capable of causing a substantially uniform thickness 338 for the layer 336 of adhesive 332 and beads 334 when applied to the first surface 328 of the part 304. The beads 334 may be capable of maintaining the substantially uniform thickness 338 for the layer of adhesive 332 when joining parts 304, 310 together. Pressure applied to one or more parts 304, 310 being joined may not result in an uneven thickness. Further, the size of the beads 334 and/or the screen 318 may maintain the thickness 338 under pressure.

In FIG. 3, a bonding environment 300 is depicted in accordance with an advantageous embodiment. In this illustrative example, bonding environment 300 may be used to create structural bond 302 between part 304 and part 306. Part 304 and part 306 may form structure 307. In these examples, part 304 and part 306 may be parts for platform 308. In these examples, platform 308 may be, for example, aircraft 200 in FIG. 2. Part 304 may take the form of composite part 305, and part 306 may take the form of composite part 310.

In these illustrative examples, composite part 305 may be skin panel 312, although other structures such as, and without limitation, floor panels, walls, frames, stringers, spars, doors, and other structures are contemplated. Composite part 310 may be a patch 314 which may be generally planar before being applied to the skin panel 312. After a planar patch 314 is applied to the skin panel 312, the patch 314 may conform to the surface contour of the skin panel 312 and thus may become curved in those applications where the skin panel 312 has a curvature. The patch 314 need not be planar; in some embodiments, the patch 314 may be curved or have contours before application to the skin panel 314. The patch 314 may be uncured or precured. Part 304 and part 306 may be bonded to each other using bonding system 316. Bonding system 316 may include screen 318, template mask 320, applicator 322, caul plate 324, and heat source 326.

Template mask 320 may be placed onto first surface 328 of composite part 305 to expose area 330. Screen 318 may then be placed onto template mask 320. Adhesive 332 and beads 334 may be applied onto first surface 328 in area 330 through screen 318 to form layer of adhesive and beads 336. Layer of adhesive and beads 336, when cured, may take the form of bond line 337.

Adhesive 332 and beads 334 may be applied in a number of different ways. For example, adhesive 332 may be mixed with beads 334 and applied together to form a layer of adhesive and beads 336. In other advantageous embodiments, adhesive 332 may be applied through openings 341 in screen 318. Openings 341 may have various shapes and sizes depending on the particular implementation.

Openings 341 may have a size capable of allowing beads 334 to pass through openings 341. Screen 318 also may have other parameters, such as, for example, without limitation, a screen weave, an opening between threads, a thread diameter, and/or other suitable parameters. These parameters may interact with bead size and adhesive properties, such as thickness, tackiness, surface tension, viscosity, and/or other adhesive properties.

Thereafter, beads 334 may be added to adhesive 332 on first surface 328 in area 330 to form layer of adhesive and beads 336. In these examples, screen 318 may have thickness 338, which may be substantially uniform. As a result, layer of adhesive and beads 336 also may substantially have thickness 338.

Some small excess amount of adhesive 332 with thickness 338 prior to joining, greater than the diameter of beads 334 may be applied to reduce and/or eliminate potential air gaps that may occur during joining of composite part 305 and composite part 310. During joining of part 305 and part 310 parts may be under vacuum bag pressure or other pressure to squeeze out excess adhesive while maintaining a uniform bond line with thickness 332 very near a diameter of beads 334. This ensures adequate fill occurs above all surface areas. Placing the screen 318 on one of the parts 305, 310 and then applying the adhesive 332 over the part, and optionally the beads 336, by forcing the adhesive/beads through the screen 318 and troweling off excess adhesive on the screen 318 may help to control the bondline thickness 338.

Applicator 322 may be used to apply adhesive 332 and/or beads 334 through screen 318 onto first surface 328 of composite part 305. Applicator 322 may remove excess adhesive 332 and/or beads 334 from screen 318 to form layer of adhesive and beads 336 having substantially thickness 338.

After layer of adhesive and beads 336 has been formed, screen 318 and template mask 320 may be removed. Second surface 340 of composite part 310 may be placed in contact with first surface 328 of composite part 305. Beads 334 within layer of adhesive and beads 336 may maintain layer of adhesive and beads 336 with substantially thickness 338. Beads 334 may provide a structural element that may maintain thickness 338 at substantially the same level. Without beads 334 in layer of adhesive and beads 336, thickness 338 may become uneven in portions of area 330 after compaction.

In the different advantageous embodiments, adhesive 332 may be selected from any adhesive that may be suitable for creating structural bond 302 between part 304 and part 306. In the different advantageous embodiments, adhesive 332 may have a viscosity such that when screen 318 is removed from the layer of adhesive and beads 336, the layer of adhesive and beads 336 may maintain substantially thickness 338.

In one advantageous embodiment, adhesive 332 may be selected to have the viscosity, tackiness, and surface tension in its uncured state to allow an appropriate level of flow to occur when screen 318 is removed. Adhesive 332 with or without beads 334 may be selected to stick to first surface 328, while maintaining a flow that will allow adhesive 332 to remain on the structure and reflow slightly after screen 318 is removed. Part of the selection of adhesive 332 takes into account the working time of adhesive 332 so the properties may be maintained during the application of adhesive 332 and the joining of first surface 328 of composite part 305 and second surface 340 of composite part 310.

Adhesive 332 may vary depending on the materials for part 304 and part 306. For example, without limitation, when part 304 and part 306 takes the form of composite part 305 and composite part 310, adhesive 332 may be an adhesive suitable for composite components.

If part 305 and/or part 310 take the form of a metal or aluminum part, a different type of adhesive may be suitable. The particular adhesive selected may depend on the material of the parts being bonded to each other, the strength of the bond desired, and other suitable factors. Adhesives that may be used include, for example, without limitation, epoxy adhesives, urethane adhesives, acrylic adhesives, and other suitable adhesives.

Beads 334 may have size 335. Size 335 may be selected based on thickness 338 or some other desired thickness. Size 355 of beads 334 may be around thickness 338. Further, an amount of beads 334 within layer of adhesive and beads 336 may vary depending on the particular implementation. Beads 334 may be comprised of a material selected from at least one of glass, metal, ceramic, rubber, and/or some other suitable material. Beads 334 may be substantially incompressible in these examples.

This incompressibility may be desirable to avoid reducing thickness 338. As used herein, the phrase "at least one of", when used with a list of items, means that different combinations of one or more of the items may be used and only one of each item in the list may be needed. For example, "at least one of item A, item B, and item C" may include, without limitation, item A or item A and item B. This example also may include item A, item B, and item C, or item B and item C.

Structure 307 may be cured to create structural bond 302. In these examples, the curing may be performed for layer of adhesive and beads 336 to form structural bond 302 between part 304 and part 306. Curing of structure 307 may be performed using heat source 326. Heat source 326 may be, for example, without limitation, a heat pad, an autoclave, or some other suitable heat source. In some advantageous embodiments, caul plate 324 may be placed onto structure 307 for the curing process. In these examples, the different operations performed using bonding system 316 may be performed manually by human operator 342 and/or automatically by robotic unit 344.

The illustration of bonding environment 300 in FIG. 3 is not meant to imply physical or architectural limitations to the manner in which different advantageous embodiments may be implemented. In some advantageous embodiments, other components may be used in addition to, or in place of, the ones illustrated. In yet other advantageous embodiments, some components may be unnecessary.

For example, in some advantageous embodiments, the use of caul plate 324 may be unnecessary during the curing process. In yet other advantageous embodiments, vent holes may be formed in composite part 310 when composite part 310 takes the form of a patch. Vent holes may help squeeze out air trapped within layer of adhesive and beads 336. In yet other advantageous embodiments, structure 307 may be bagged for the curing process. Vacuum bagging or vacuum bagging and autoclave compaction may help to compress the bond line to the minimum thickness allowed by beads 334.

As another illustrative example, in some advantageous embodiments, screen 318 may be placed onto first surface 328 with template mask 320 being placed over screen 318. In yet other advantageous embodiments, template mask 320 may be unnecessary. In still other advantageous embodiments, adhesive 332 also may be placed on second surface 340 of part 306. In still other illustrative examples, advantageous embodiments may place an activator on second surface 340 of part 306. An activator may cause adhesive 332 to enter a state in which adhesive 332 cures or can be cured.

Figure 4:
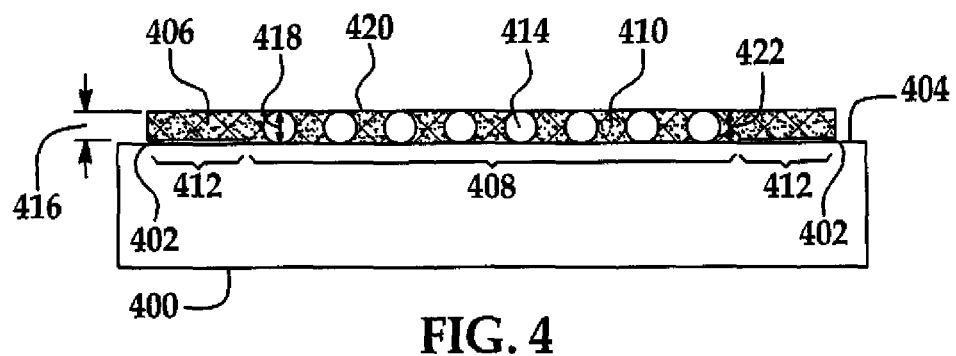
FIG. 4 is an illustration of a diagram showing a cross-sectional view of application of an adhesive in accordance with an advantageous embodiment.

With reference now to FIG. 4, a diagram of a cross-sectional view of an adhesive is depicted in accordance with an advantageous embodiment. In this example, part 400 is an example of part 304 in FIG. 3.

Part 400 may be, for example, without limitation, a skin panel or some other suitable part. Part 400 may be comprised of a material such as, for example, without limitation, a composite material, aluminum, titanium, and/or some other suitable material. In this example, mask 402 may be placed on surface 404 of part 400. Screen 406 may be placed onto mask 402. In these examples, mask 402 may expose area 408. Adhesive 410 may be applied onto surface 404 in area 408. Mask 402 may prevent adhesive 410 from being applied or deposited onto sections 412 on surface 404 outside of area 408. Beads 414 may be mixed with adhesive 410 or applied separately, depending on the particular implementation.

In these examples, screen 406 may have thickness 416. Beads 414 may have diameter 418. Diameter 418 may be substantially the same value as thickness 416 and may be substantially consistent between different beads in beads 414. With the use of screen 406, layer of adhesive and beads 420 may be applied to have thickness 422, which may be substantially the same thickness as thickness 416 in area 408. In other words, thickness 416 of screen 406 may set thickness 422 of layer of adhesive 410 and beads 420. Beads 420 may substantially maintain thickness 422 after screen 406 has been removed.

Figure 5:
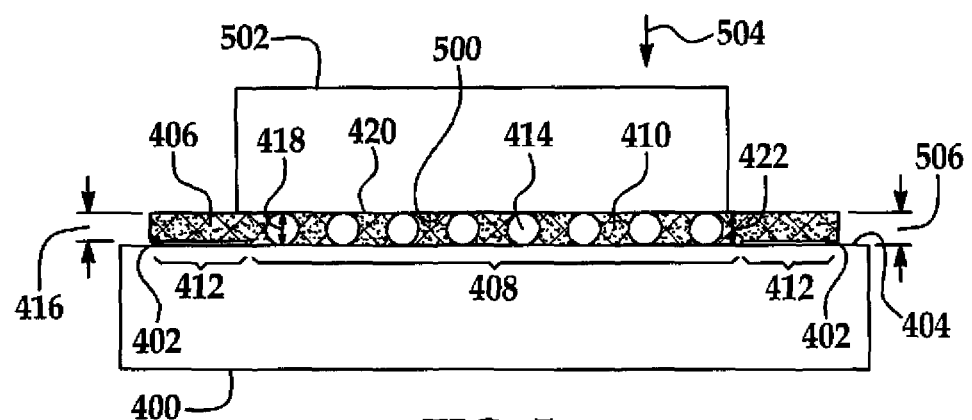
FIG. 5 is an illustration of a diagram showing a cross-sectional view of a structure with a layer of adhesive and beads in accordance with an advantageous embodiment.

Turning next to FIG. 5, a diagram of a cross-sectional view of a structure with a layer of adhesive and beads is depicted in accordance with an advantageous embodiment. In this illustrative example, surface 404 of part 400 may be placed into contact with surface 500 of part 502. Part 502 may be, for example, a generally planar patch or other repair piece for part 400. However, in some embodiments, as previously mentioned, the part 400 may not be planar.

In the different advantageous embodiments, force may be applied on part 502 in the direction of arrow 504. Beads 414 within layer of adhesive and beads 420 may reduce and/or prevent a reduction in thickness 422 beyond beads 414 thickness for layer of adhesive and beads 420. Further, beads 414 may prevent unevenness within thickness 422 in area 408 of layer of adhesive and beads 420. In these examples, beads 414 may be spherical in shape. Of course, any shape may be used, depending on the particular implementation. In these illustrative examples, any shape that may avoid stacking between beads 414 may be used for beads 414.

In some advantageous embodiments, thickness 422 may be greater than diameter 418. With this type of implementation, the layer of adhesive and beads 420 may reduce in value to thickness 506 based on diameter 418 of beads 414, which corresponds to the final bondline thickness 338 (FIG. 3).

Figure 6:
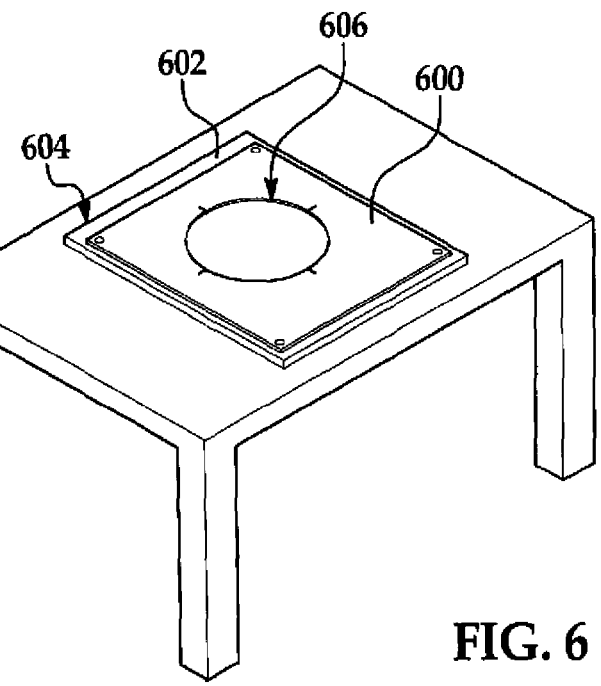
FIG. 6 is an illustration of a diagram showing a mask on a part in accordance with an advantageous embodiment.

With reference now to FIGS. 6-12, diagrams illustrating application of adhesive and beads to a part are depicted in accordance with an advantageous embodiment. FIG. 6 is a diagram of a mask on a part in accordance with an advantageous embodiment. With reference first to FIG. 6, mask 600 may be placed on surface 602 of part 604. Mask 600 may expose area 606 on surface 602. Area 606 may be an area on which adhesive may be applied.

Figure 7:
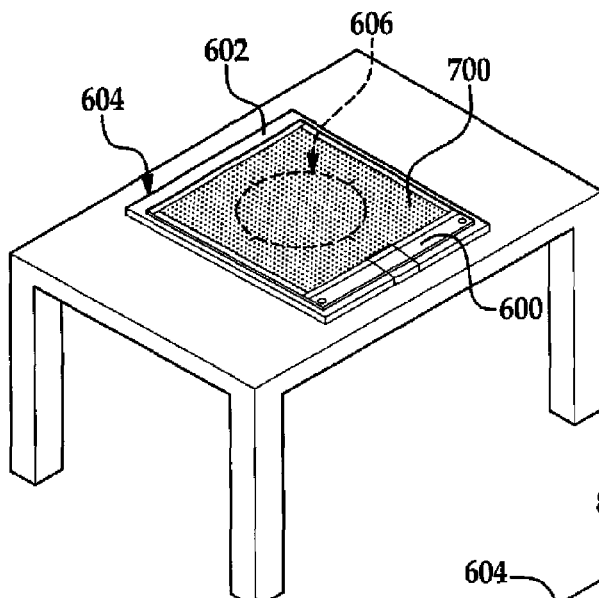
FIG. 7 is an illustration of a diagram showing a part being prepared for an adhesive in accordance with an advantageous embodiment.

With reference to FIG. 7, a diagram of a part being prepared for an adhesive is depicted in accordance with an advantageous embodiment. In this example, screen 700 has been placed over mask 600 on part 604. As a result, adhesive may only pass through screen 700 onto surface 602 in area 606 of part 604.

Figure 8:
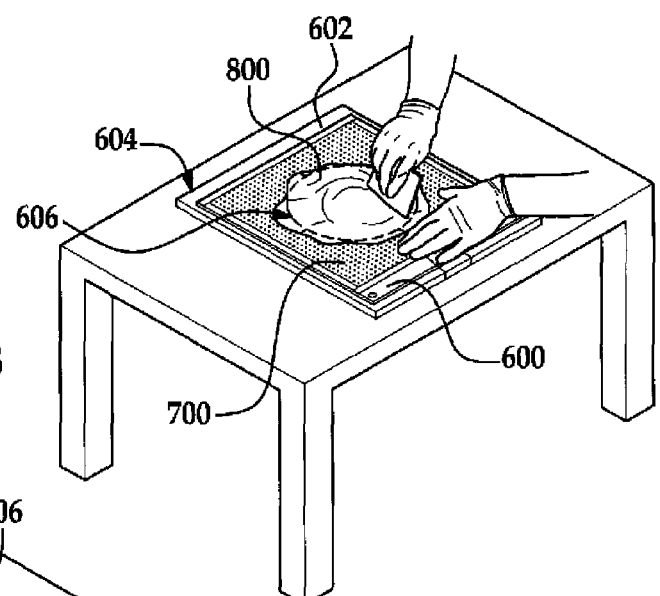
FIG. 8 is an illustration of a diagram showing application of an adhesive and beads in accordance with an advantageous embodiment.

With reference now to FIG. 8, a diagram illustrating application of an adhesive and beads is depicted in accordance with an advantageous embodiment. In this example, adhesive and beads 800 may be applied to surface 602 through screen 700. Adhesive and beads 800 may only be applied to area 606 because of mask 600.

Figure 9:
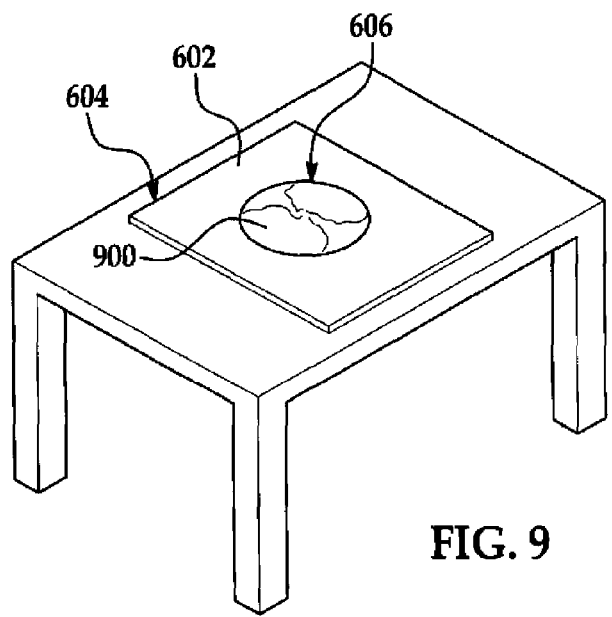
FIG. 9 is an illustration of a diagram showing a part with adhesive and beads in accordance with an advantageous embodiment.

In FIG. 9, a diagram of a part with adhesive and beads is depicted in accordance with an advantageous embodiment. In this example, layer of adhesive and beads 900 remains after removal of screen 700 (not shown) and mask 600 (not shown). Part 604 may now be ready for joining and/or bonding.

Figure 10:
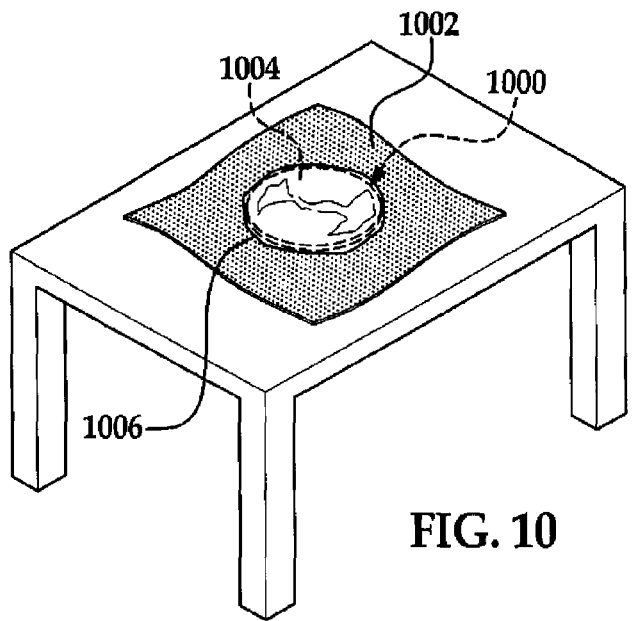
FIG. 10 is an illustration of a diagram showing application of adhesive to a part in accordance with an advantageous embodiment.

With reference now to FIG. 10, a diagram illustrating application of adhesive to a part is depicted in accordance with an advantageous embodiment. In this example, part 1000 has screen 1002 placed on surface 1004. Adhesive 1006 may have been applied to surface 1004 through screen 1002. In this example, adhesive 1006 may not include beads.

Figure 11:
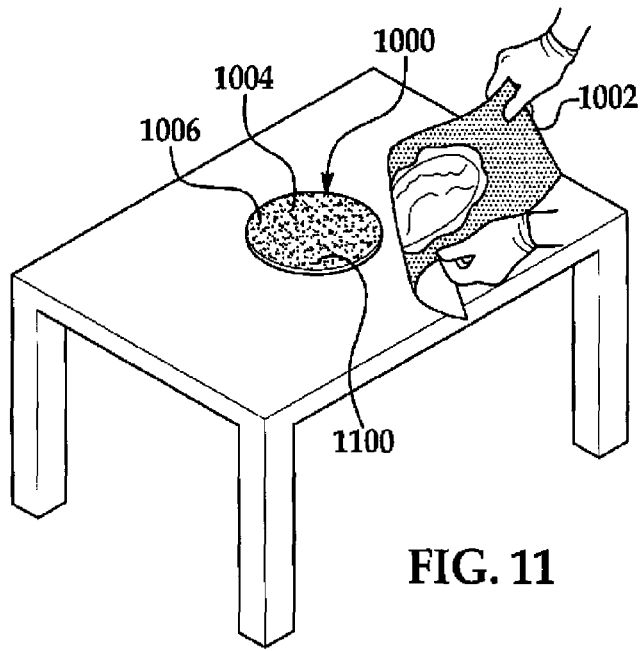
FIG. 11 is an illustration of a diagram showing removal of a screen from a part with adhesive in accordance with an advantageous embodiment.

Turning to FIG. 11, a diagram illustrating removal of a screen from a part with adhesive is depicted in accordance with an advantageous embodiment. In this illustrative example, screen 1002 has been removed from part 1000. The substantially uniform adhesive layer 1100 remains on surface 1004. In some advantageous embodiments, adhesive layer 1100 may take the form of an activator.

Figure 12:
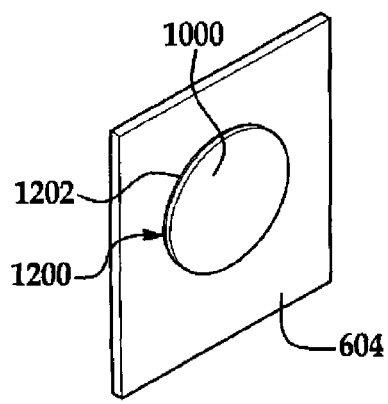
FIG. 12 is an illustration of a diagram showing two parts bonded to each other in accordance with an advantageous embodiment.

With reference now to FIG. 12, a diagram illustrating two parts bonded to each other is depicted in accordance with an advantageous embodiment. In this example, part 1000 may be placed against part 604 and cured to form structural bond 1200 seen as bond line 1202. Part 1000 and part 604 may be cured using heat and application of pressure. The thickness or bond line may be consistent for structural bond 1200 in this example.

The different operations and features illustrated in FIGS. 6-12 are not meant to imply limitations to the manner in which different advantageous embodiments may be implemented. Some advantageous embodiments may have other features and/or operations in addition to, or in place of, the ones illustrated. Further, in some advantageous embodiments, some of the features and/or operations may be unnecessary. For example, in some advantageous embodiments, adhesive 1006 may be unnecessary for part 1000. In yet other advantageous embodiments, screen 700 may be placed onto surface 602 of part 604 with mask 600 being placed onto screen 700.

Figure 13:
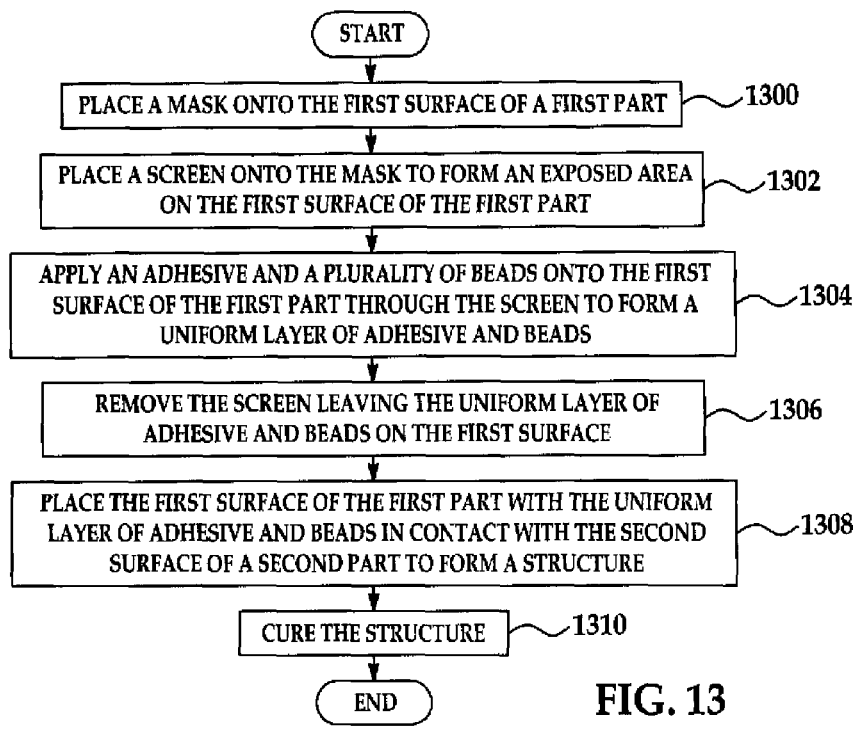
FIG. 13 is an illustration of a flowchart showing a process for bonding parts in accordance with an advantageous embodiment.

With reference now to FIG. 13, a flowchart of a process for bonding parts is depicted in accordance with an advantageous embodiment. The process illustrated in FIG. 13 may be implemented using a bonding environment such as, for example, bonding environment 300 in FIG. 3.

The process may begin by placing a mask onto the first surface of a first part (operation 1300). The process may then place a screen onto the mask to form an exposed area on the first surface of the first part (operation 1302). The process may then apply an adhesive and a plurality of beads onto the first surface of the first part through the screen to form a uniform layer of adhesive and beads (operation 1304). The screen may be used as a leveling device to achieve the uniform layer of adhesive and beads. The screen may be removed leaving the uniform layer of adhesives and beads on the first surface of the first part (operation 1306).

The process may place the first surface of the first part with the layer of adhesive and beads in contact with the second surface of a second part to form a structure (operation 1308). The process may cure the structure (operation 1310), with the process terminating thereafter.

Figure 14:
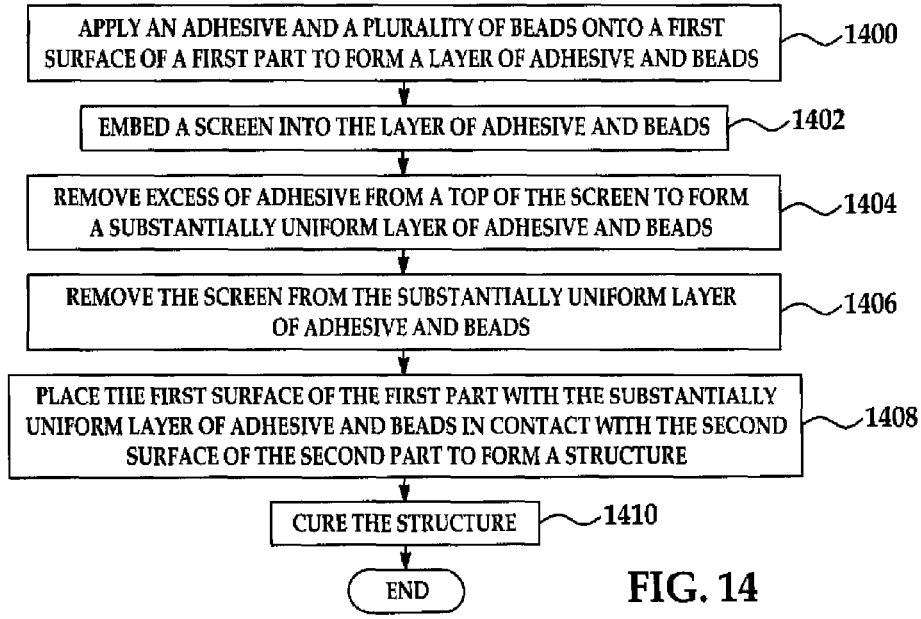
FIG. 14 is an illustration of a flowchart showing a process for bonding parts in accordance with an advantageous embodiment.

With reference now to FIG. 14, a flowchart of a process for bonding parts is depicted in accordance with an advantageous embodiment. The process illustrated in FIG. 14 may be implemented using a bonding environment such as, for example, bonding environment 300 in FIG. 3.

The process may begin by applying an adhesive and a plurality of beads onto a first surface of a first part to form a layer of adhesive and beads (operation 1400). The process may then embed a screen into the layer of adhesive and beads (operation 1402). Excess of adhesive may be removed from a top of the screen to form a substantially uniform layer of adhesive and beads (operation 1404). The screen may then be removed from the substantially uniform layer of adhesive and beads (operation 1406).

The first surface of the first part with the substantially uniform layer of adhesive and beads may be placed in contact with the second surface of a second part to form a structure (operation 1408). The process may then cure the structure (operation 1410), with the process terminating thereafter.

The process illustrated in the flowcharts in FIGS. 13 and 14 may be performed in a number of different ways. In some advantageous embodiments, other operations may be used in addition to, or in place of, the ones illustrated. Further, some operations may be performed simultaneously. In yet other advantageous embodiments, some operations may be omitted.

For example, operation 1306 may be omitted to leave the screen and beads in place when placing the first surface in contact with the second surface. In yet other advantageous embodiments, the layer of adhesive may be placed through the screen without beads and the screen left in place. For example, in some advantageous embodiments, adhesive also may be applied to the second surface of the second part. In still other embodiments in which an adhesive is used having two components, the first component of the adhesive may be applied to the first surface of the first part, and the second component of the adhesive may be applied to the second surface of the second part; the two adhesive components become mixed when the two parts are placed in face-to-face contact.

In another example, the adhesive may not include beads. As another example, the application of the adhesive and the plurality of beads onto the first surface may be performed by applying a mixture of the adhesive and the plurality of beads. In other advantageous embodiments, the adhesive may be applied to the first surface. The beads may then be applied to the first surface through the screen.

Thus, the different advantageous embodiments provide a method and apparatus for bonding parts to each other. The different advantageous embodiments may provide a capability to create a layer of adhesive that may have a thickness that is around a substantially desired value. Further, the use of beads in the adhesive may maintain a uniform layer of adhesive with the value for the desired thickness during and after a compaction pressure is applied to the parts.

With one or more of the advantageous embodiments, repeatability may be provided in bonding parts. In the illustrative examples, repeatability may include, for example, without limitation, consistent structural bonds, consistent strength, consistent design, and certification margins as structural integrity of parts may be more predictable using different advantageous embodiments. These and possible other features may provide easier and quicker certification of parts and/or products.

Figure 15:
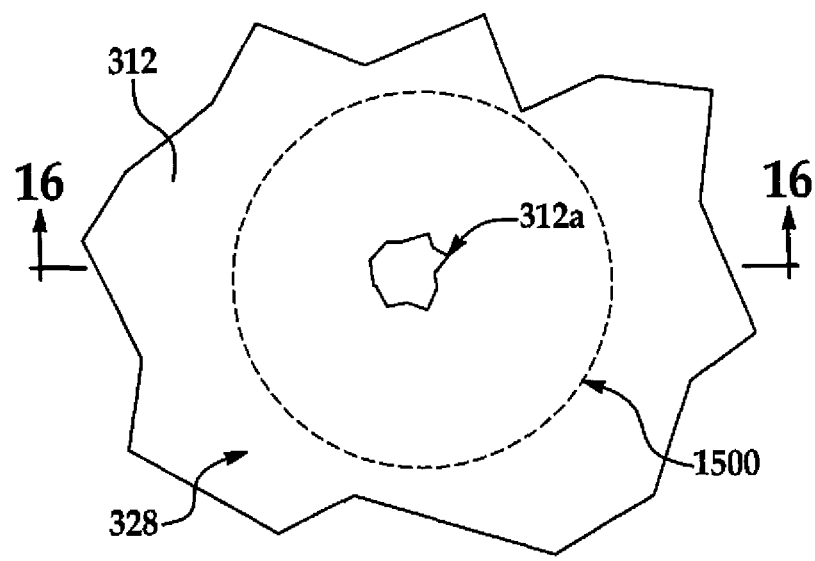
FIG. 15 is an illustration of a plan view of a section of a structure having an area requiring rework.
Figure 16:
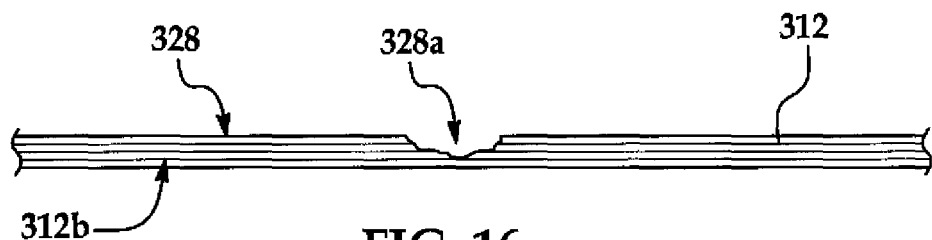
FIG. 16 is an illustration of a sectional view taken along the line 16-16 in FIG. 15.

Attention is now directed to FIGS. 15 and 16 which illustrate a composite skin panel 312 such as that found on an airplane. In this example, the skin panel 312 has a localized area 312*a* that is to be reworked. As used herein, "rework", "reworked" and "reworking" are used in their broadest sense and are intended to include, without limitation, rework, repair, restoration, improvements and modifications that may either return a structure to its original loading carrying ability and/or specifications, or improve or increase the performance of the structure in one or more respects. However, it should also be noted here that while the disclosed embodiments illustrate an application involving rework of an existing skin panel 312, the embodiments may be employed during the initial manufacturing and assembly of the airplane to form certain areas of the skin panel 312 and/or to attach one or more components to the skin panel 312. Thus, as used in the following description and appended claims, the term "patch" is further defined to include various forms of parts that are bonded on another structure, such as components that are bonded to an airplane structure during the initial manufacturing of the airplane. In the illustrated example, the area 312*a* is a depression 328*a* (FIG. 16) which extends down from the outer surface 328 and penetrates through several plies 312*b* of the skin panel 312. In other applications, the area 312*a* simply be a deformation or "dent" in the skin panel 312 that extends down into one or more of the plies 312*b* but which does not penetrate the plies. While the skin panel 312 in the drawings is shown as being substantially flat, the skin panel 312 may have a contours or curvatures, in which case a planar patch 314 applied to the skin panel 312 may conform to the contour or curvature of the skin panel 312. Also, while the patch 314 shown in the drawings is substantially planar, in other embodiments, the patch 314 may have other shapes including but not limited to curves, contours and/or tapers. Also, as mentioned previously, the patch 314 may be a composite that is uncured or precured.

In some situations, such as when the aircraft is required to remain in service and it is important to avoid schedule interruptions, it may be necessary to perform the rework "in the field" outside of a hangar environment where specialized equipment, special handling and/or skilled maintenance technicians are available. For example, it may be necessary to perform the necessary rework within a limited time while the airplane is parked at an airport gate in order to avoid a schedule delay. In accordance with the disclosed embodiments, the needed rework may be performed relatively quickly by workers such as line mechanics who may have limited knowledge of composite materials.

Figure 17:
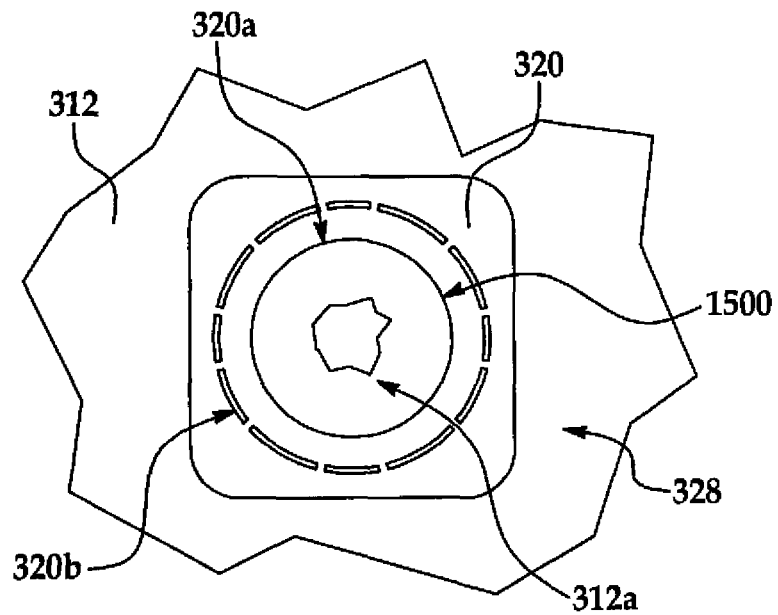
FIG. 17 is an illustration of a plan view showing a template having been placed over the area being reworked.

The rework may begin by reworking a section 1500 (FIG. 15) generally surrounding the area 312*a* requiring rework. Referring to FIG. 17, a template mask 320 includes a central opening 320*a*, which in the illustrated example, is substantially circular and is coextensive with the rework area 1500, however other shapes of openings are possible, depending on the application. The central opening 320*a* may serve as both a sanding template during the preparation of the surface 328 of the skin panel 312, and as a template for centering a patch 314 (FIG. 18) over the area 312*a* requiring rework. The template mask 320 further includes ring shaped, intermittent perforations 320*b* concentrically surrounding the central opening 320*a*. The ring shaped perforations 320*b* may be used to mark the outer boundary on the surface 320*a* where paint is to be removed from the skin panel 312 as part of the rework process. Further details of the process for preparing the surface 328 to receive the bonded patch 314 will be discussed below in more detail.

Figure 18:
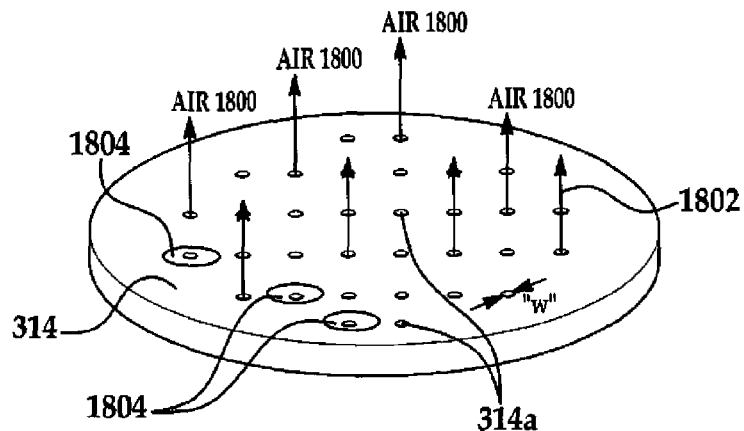
FIG. 18 is an illustration of an isometric view of the patch, and showing perforations therein.

FIG. 18 illustrates a patch 314 suitable for reworking the area 312a on the skin panel 312 shown in FIGS. 15-17. In this example, the generally planar patch 314 is substantially circular and includes a plurality of through hole perforations 314a that are distributed across the patch 314. As will be discussed below, the perforations 314a may allow the escape of air 1800, as shown by arrows 1802 from beneath the patch 314 as it is being compacted against the surface 328 of the skin panel 312 during the patch installation process. Desirably, each of the perforations 314a may have a diameter or maximum width "w" that is sufficiently great to also allow the escape of excess adhesive 1804 from beneath the patch 314.

Figure 19:
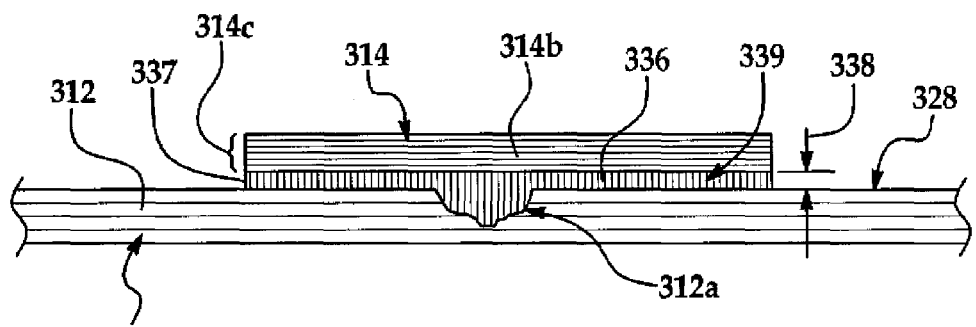
FIG. 19 is an illustration of a sectional view of the structure shown in FIG. 15 in which a patch and a layer of adhesive have been placed over the area requiring rework.

Referring now to FIG. 19, the patch 314 may comprise multiple plies 314b of pre-cured composite materials. In other embodiments, the patch 314 may be uncured. The patch 314 is bonded to the skin panel 312 overlying the area 312a to be reworked by a layer of viscous adhesive 336 forming a bond line 337 having a controlled thickness 338. As used herein, "viscous" refers to the fact that the adhesive 336 is spreadable and may flow to some degree as force is applied to it. The layer of adhesive 336 may be a fast curing type of adhesive tailored to the particular application by selecting predetermined viscosity, tackiness and surface tension properties in its uncured state. The viscosity and tackiness of the adhesive 336 should be such that it will stick to the skin panel 312 and/or the patch 314, yet remain flowable during completion of the patch installation process.

The adhesive may include the previously discussed beads 334, and/or a screen 318 (see FIG. 3). The screen 318 and/or the beads 334 function as a spacer 339 having a thickness that substantially corresponds to the desired thickness 338 of the bond line 337. In other embodiments, the screen 318 may be used to apply adhesive 332 to the controlled thickness 338 of the desired bond line 337, following which the screen 318 may be removed prior to the application of the patch 314, in which case the remaining beads 334 assist in controlling the thickness 338 of the bond line 337. The layer 336 of adhesive 332 and beads 334 substantially fill the area 312a being reworked, including the depression 328a (FIG. 16) in the skin panel 312. In other embodiments, area 312a may be filled with a suitable filler (not shown) having a composition that is different than that of the adhesive 332, and then covered with the adhesive 332.

The amount of adhesive 332 that is applied to the patch 314 and/or the skin panel 312 may vary with the particular application, including the size and the depth of the area 312a requiring rework. Where nearly the correct amount of adhesive 332 is applied and is substantially evenly spread over the rework area 312a, it is possible that little or no excess adhesive 332 may be squeezed through the perforations 314a as the patch 314 is being compacted. In this case, only air (from air pockets) may be expelled as result of the adhesive 332 redistributing itself beneath the patch 314 so as to even out high and low areas of adhesive 332 and fill the air pockets. In other cases however, where more than the correct amount of adhesive 332 is applied, it may be possible to use observations of the location and/or the amount of excess adhesive 332 that is squeezed out through the perforations 314a as a guide to determine whether conditions have been met for achieving a satisfactory bond. In any event, the perforations 314a may assist in allowing the adhesive 332 to be redistributed beneath the patch 314 in a manner such that the adhesive contacts substantially the entire area of the patch 314. A rework technician's observations of excess adhesive 332 being squeezed through the perforations 314a may be used to assist in confirming that any air pockets have been substantially eliminated and that the adhesive 332 is in contact with substantially the entire area of the patch 314.

Figure 20:
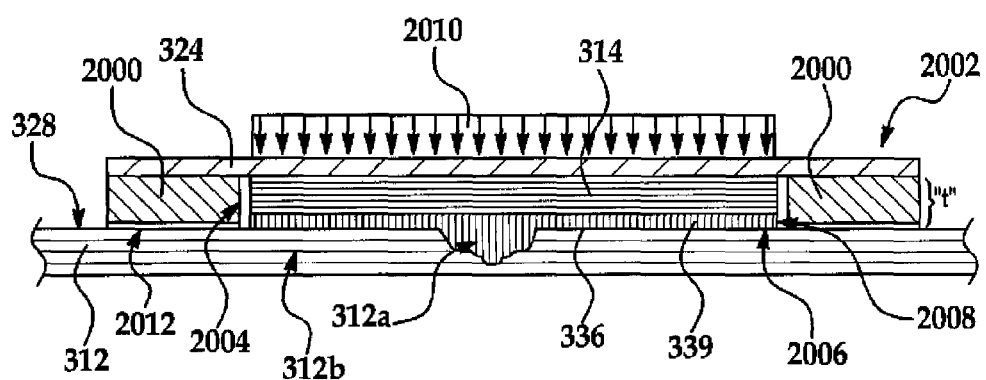
FIG. 20 is an illustration of a view similar to FIG. 19 but showing a caul plate and an anti-caul plate having been installed over the patch.
Figure 21:
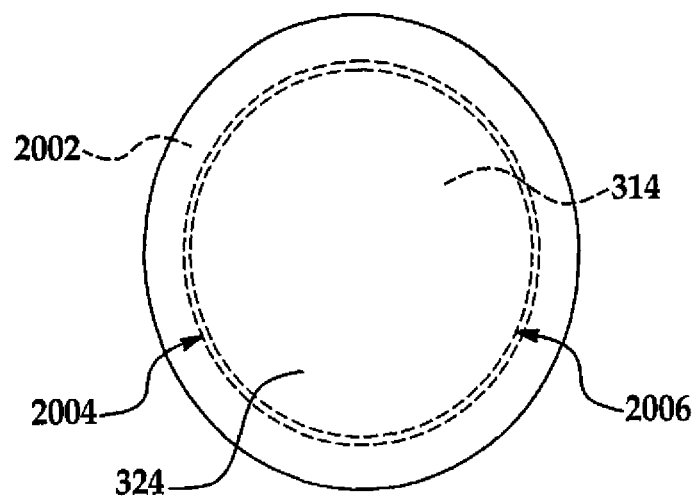
FIG. 21 is an illustration of a top view showing the caul plate wherein the position of the anti-caul plate and the patch is indicated in the phantom.

Attention is now directed to FIGS. 20 and 21 which illustrate a caul plate 324 placed over the patch 314 in preparation for compacting the patch 314 down onto the surface 328 of the skin panel 312. In accordance with the disclosed embodiments, a spacer in the form of a ring shaped anti-caul plate 2000 is placed between the caul plate 324 and the surface 328 of the skin panel 312, near the outer perimeter 2002 of the caul plate 324, so as to support the caul plate 324 at its outer perimeter 2002. The interior edge 2004 of the anti-caul plate 2002 is radially spaced slightly outside of the outer periphery 2006 of the patch 314. The anti-caul plate 2000 has a thickness "t" substantially equal to the combined thickness 314c of the patch 314 and the desired thickness 338 of the bond line 337. The bottom surface 2012 (FIG. 20) of the anti-caul plate 2000 engaging the surface 328 of the skin panel 312 is shown as being flat in the illustrated example, however the bottom surface 2012 may have other shapes or contours that may be selected to match the shape/contour of the surface 328 of the skin panel 312. In the illustrated example, the anti-caul plate 2000 has the shape of a continuous ring (see FIG. 21), however other shapes are possible. For example, the outer periphery of the anti-caul plate 2000 may be square. In any event, it is normally desirable that the caul plate 324 and the anti-caul plate 2000 having substantially matching foot prints. Also, in other embodiments the anti-caul plate 2000 may comprise two or more contiguous or spaced part sections (not shown) which support the outer perimeter 2002 of the caul plate 324 at multiple locations around the patch 314.

The anti-caul plate 2000 functions to react force applied by the caul plate 324 to the patch 314 near the outer periphery 2006 of the patch 314. By supporting the outer perimeter 2002 of the caul plate 324, the anti-caul plate 2000 may reduce or prevent substantial tipping, slanting and/or bending of the caul plate 324. As a result of controlling this force at the outer periphery 2006 of the patch 314, the force 2010 applied to the caul plate 324 is substantially constant over substantially the entire area of the patch 314. Consequently, the tendency of the caul plate 324 to apply higher forces near the outer periphery 2006 of the patch 314 (due to bending, tipping, slanting, etc.) may be avoided, which could otherwise result in tapering of the bond line 337 near the outer periphery 2006 of the patch 314. Therefore, the thickness 338 of the bond line 337 may remain substantially constant over the entire area of the patch 314 during the compaction process. In addition, the anti-caul plate 2000 acts as a spacer, similar to the function provided by the screen 318 previously described when left between the patch 314 and the skin panel 312, which limits compaction of the adhesive 332 to the desired bondline thickness 338 (FIG. 3). Thus, in one embodiment, the screen 318 can be used as a first spacer to control the thickness and uniformity of the adhesive 332 that is applied to the skin panel 312 or other structure. In those applications where the screen 318 is removed after application of the layer 336 of adhesive 332, the anti-caul plate 2000 can be used as a second spacer that limits the compaction of the adhesive layer 336 during the compaction process to the desired bondline thickness 338.

Figure 22:
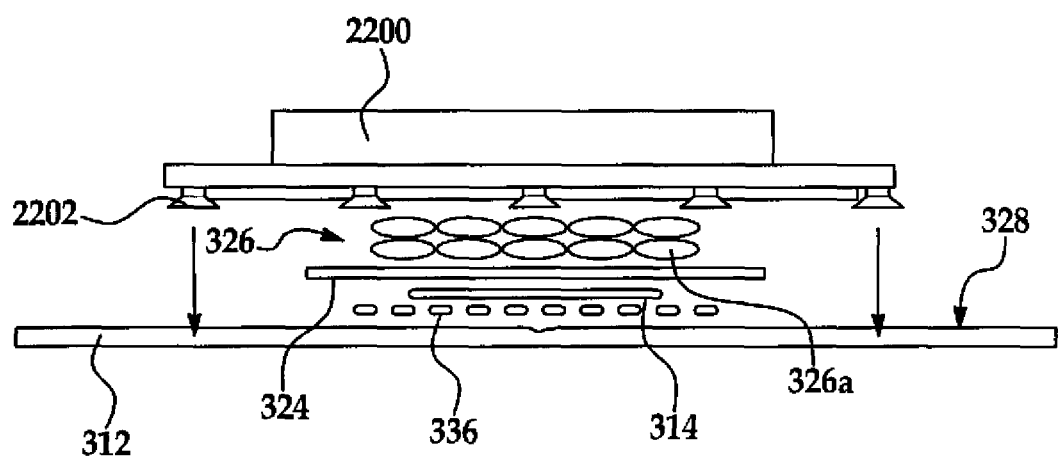
FIG. 22 is an illustration of an exploded view of apparatus for carrying out the patching method, including a heat pack and a compactor for applying force to the patch.

FIG. 22 illustrates one embodiment of equipment that may be used to heat and compact the patch 314 in field applications. A heat source 326 (FIG. 3) in the form of a heat pack 326a is placed on top of the caul plate 324 and a compactor 2200 is positioned over the caul plate 324 and heat pack 326a. The compactor 2200 may include a series of suction devices 2202 which releasably mount the compaction device 2200 on the surface 328 of the skin panel 312. The heat pack 326a applies the heat necessary to cure the adhesive layer 336 while the compactor 2200 applies the force to the caul plate 324 necessary to compact the patch 314 against the surface 328 of the skin panel 312. Other forms of portable compaction devices may be employed to apply the necessary compaction force to the patch 314. For example, a vacuum bag assembly (not shown) may be assembled over the heat pack 326a, caul plate 324 and patch 314, which is then sealed to the surface 328 of the skin panel 312. Alternatively, depending upon the location of the patch 314 on the skin panel 312, the compaction device may comprise a simple weight (not shown) that relies on gravity to apply the necessary compaction force to the patch 314.

Figure 23:
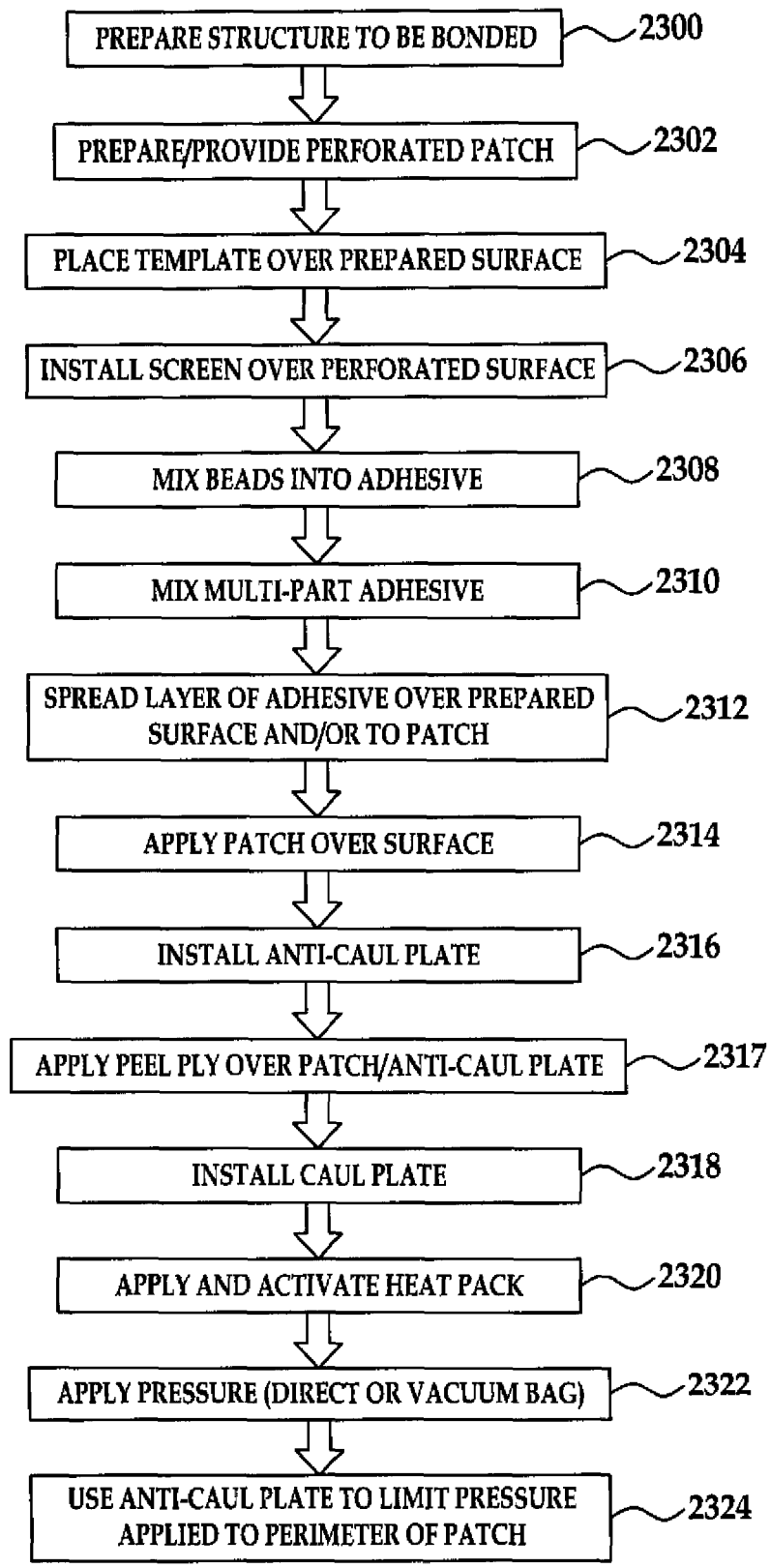
FIG. 23 is an illustration of a flow diagram showing the steps of a method for reworking a structure using a bonded patch.

Attention is now directed to FIG. 23 which broadly illustrates the steps of a method of reworking an area 312a on a structure, such as the previously described composite skin panel 312. The method begins at step 2300 in which a structure, such as the skin panel 312 is prepared to receive the bonded patch 314. Preparation of the substructure may involve removing any protruding material that may prevent the patch 314 from laying flush with the surface of the structure. The protruding material may be removed, without limitation, by trimming or sanding. Step 2300 also includes placing the template mask 320 (FIG. 17) over the structure and marking the outer boundaries 320b (FIG. 17) of the area where paint and other surface coatings may be removed prior to the bonding process. The template mask 320 may also be used as a surface material removal guide during step 2300. Suitable solvents may be used as part of step 2300 in order to clean the structure surface of contaminates, including sanding dust.

Next, at 2302, a suitable patch 314 is prepared in which a pre-cured doubler (314) is selected and trimmed in size and shape to fit properly over the rework area 312a. At step 2304, the template mask 320 may be placed over the skin surface and held in place, as by tape.

At step 2306, a screen 318 may be placed over the prepared surface, overlying the template mask 320, in preparation for the application of adhesive. At 2308, optionally, the previously discussed beads 334 may be mixed into at least one component of the adhesive 332 and at 2310, the component parts of the adhesive 332 may be mixed together to form a relatively quick drying/curing bonding adhesive. In some embodiments, the adhesive 332 may comprise only one component, in which case the beads 334 may be mixed into the single component. Next, at 2312, a layer of the adhesive 332, optionally containing the beads 334, may be spread over the prepared skin surface 328 and/or to the patch 314 using an applicator 322 which may comprise, for example and without limitation, a toothed trowel (not shown) that may be used to achieve a predetermined thickness of the adhesive. In some applications using a two component adhesive, one of the components may spread over one of the skin surface 328 and the patch 314, and the other component may be spread over the other of the skin surface and the patch 314. In those applications where the optional screen 318 is employed, a slightly larger, excess amount of adhesive than is ultimately needed may be applied in order to reduce the possibility of air pockets, since the screen 318 may be used to control the final thickness of the adhesive layer 336. The toothed trowel may be used to evenly spread the adhesive over the structure surface 328 and the patch 314, however, in those applications where a screen 318 is used, a non-toothed trowel (not shown) may be used to spread the adhesive 332 over the surface structure 328 and force it through the screen 318. The template mask 320 may be used to control the shape and location of the adhesive layer 336 applied to the structure surface 328. It should be noted here that the template mask 320 and the screen 318 may be combined into as single component and manufactured using well known photolithographic techniques.

At 2314, the patch 314 is centered over the rework area 312a using the template mask 320 and the patch 314 is applied by hand to the structure surface 328, using the template mask 320 as a guide to locate and center the patch. At 2316, the anti-caul plate 2000 is installed, following which at step 2317, a peel ply (not shown) may be placed over both the patch 314 and the anti-caul plate 2000. Next, the caul plate 324 may be installed, as shown at 2318.

At step 2320, a suitable heating source 326, such as the heat pack 326a (FIG. 22) may be placed over the caul plate 324 and may be activated. The heat pack 326a may be a self contained package, such as a chemical heat pack that is activated by breaking a frangible seal (not shown) and kneading the pack until chemicals contained in the pack thicken and produce heat by an exothermic reaction. In some applications, an adhesive 332 may be employed that cures at room temperature, in which case the heat pack 326a or similar heat source may not be necessary. Next, at step 2322, pressure is applied to the combination of the heat pack 326a, caul plate 324 and patch 324 by any of several means. For example, a vacuum compaction unit 2200 may be placed over the patch 324 and secured to surface 328 using suction cups 2202. The compaction unit 2200 may comprise a vacuum unit which, when activated, draws a vacuum over the reworked area that results in a downward force being applied to the caul plate 324 which in turn forces the patch 314 down against the surface 328 of the structure. Alternatively, a vacuum bag assembly (not shown) may be assembled over the reworked area and sealed to the surface of the skin panel, following which a vacuum may be drawn in the bag assembly to apply pressure to the patch 314. Finally, as previously mentioned, in some applications, it may be possible to apply the necessary pressure to the patch 314 by placing a weight (not shown) on the caul plate 324.

When the patch 314 is initially applied to the structure surface 328, air pockets (not shown) may be present either within the adhesive layer 336, or between the adhesive layer 336 and the patch 314. One or more of these air pockets may be the result of there being slight variations in the thickness of the adhesive layer 336 which creates high or low spots in the adhesive. As the caul plate 324 applies pressure to the patch 314, the perforations 314a (FIG. 18) allow air, as well as excess adhesive 1804 to escape or "squeeze-out" from the patch 314, thereby allowing the adhesive to spread evenly to a substantially uniform, predetermined thickness 338. The beads 334 and/or the screen 318 act as a spacer 339 (FIGS. 19 and 20) to assist in maintaining the desired bond line thickness 338.

As pressure is applied to the patch 314 by the caul plate 324, the anti-caul plate 2000 acts as a spacer that reacts the force applied near the periphery 2006 of the patch 314 so that the pressure applied over the entire area of the patch 314 may be substantially uniform. Further, as pressure is applied to the patch 314 during the compaction and curing process, the beads 334 and/or the screen 318 function as a spacer 339 to partially react the applied force which results in a desired thickness 338 of the bond line 337.

Figure 24:
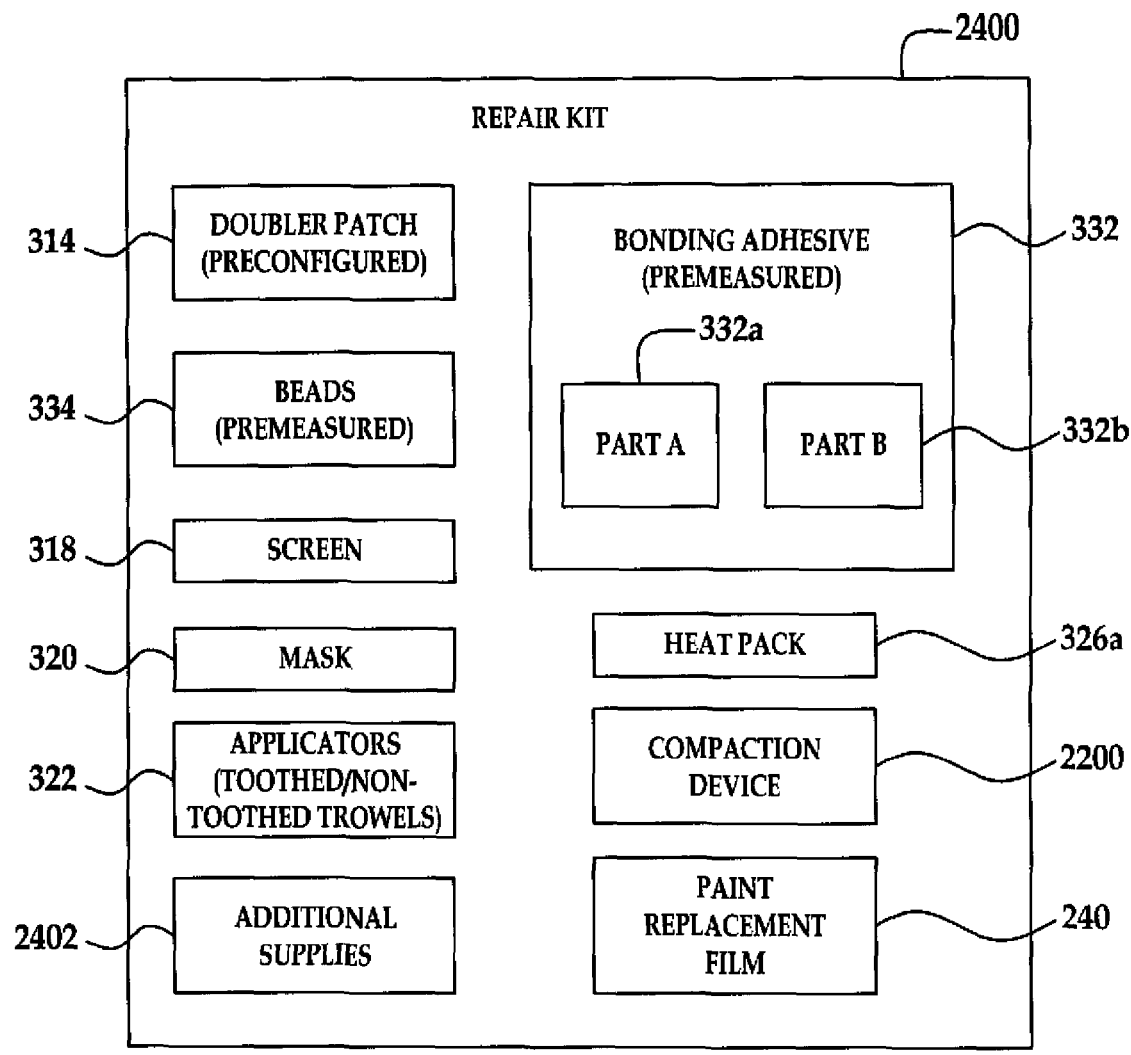
FIG. 24 is an illustration of a block diagram showing components of a pre-packaged kit that may be used to rework a structure using a bonded patch.

Attention is now directed to FIG. 24 which illustrates, in block diagram form, the components of a prepackaged rework kit 2400 that may be used by personnel to perform relatively rapid reworking of composite skin panels or similar structures in the field. The kit 24 may include a preconfigured doubler patch 314, a pre-measured amount of beads 334, a mesh-like screen and/or spacer 318, a template mask 320, an adhesive applicator such as a toothed trowel 322, a bonding adhesive 332 including pre-measured amounts of multiple reactive parts 332a, 332b, a heat pack 326a for use in curing the adhesive, a compaction device 2200 for applying pressure to the patch, a paint replacement film 240 that may be used to replace any paint on the skin surface that was previously removed, and any number of additional supplies 2402 such as cleaning supplies, solvents, gloves, release films, etc. that may be necessary to carry out the rework described above. The kit 2400 may include more or less components than those described above.

Figure 25:
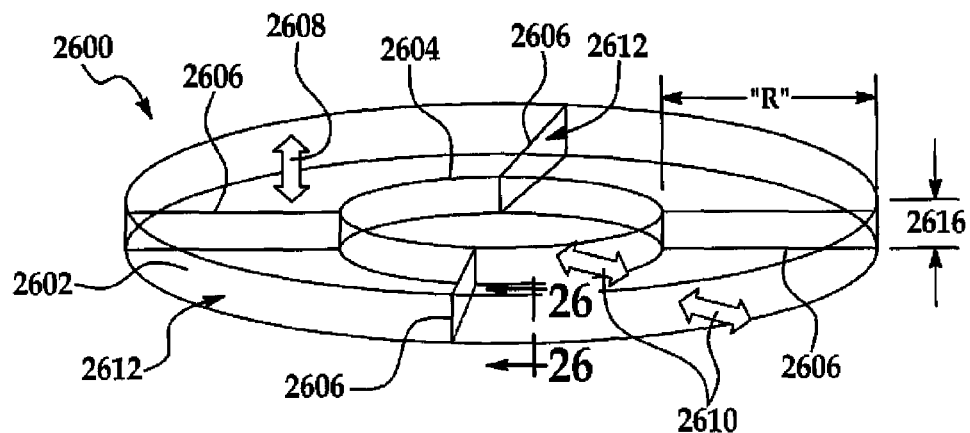
FIG. 25 is an illustration of a perspective view of an alternate embodiment of a spacer.
Figure 26:
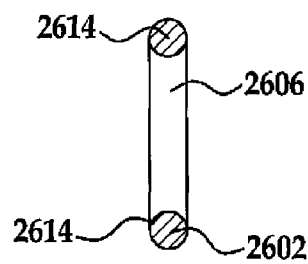
FIG. 26 is an illustration of a sectional view taken along the line 26-26 in FIG. 25.
Figure 27:
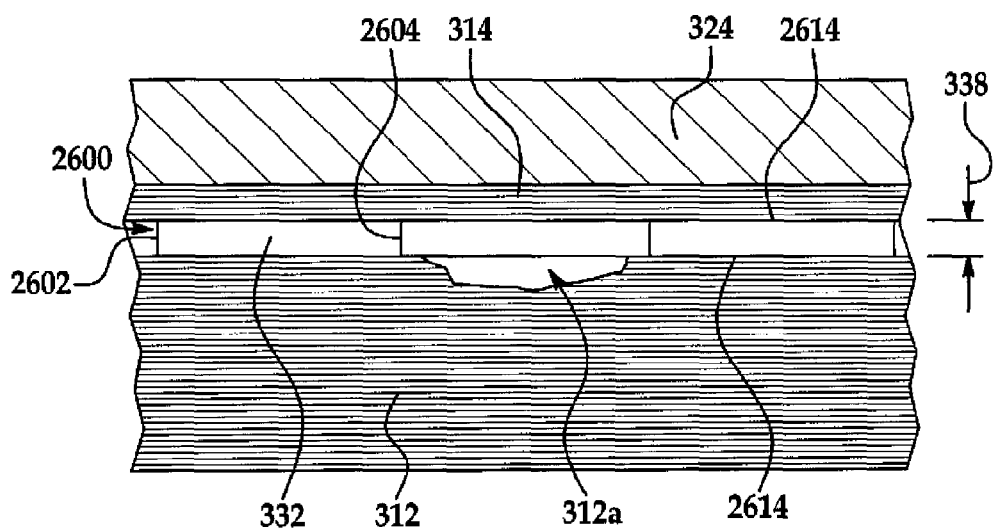
FIG. 27 is an illustration of a sectional view showing the use of the spacer of FIG. 25 to maintain bondline thickness during patch compaction.

Attention is now directed to FIGS. 25, 26 and 27 which illustrate an alternate form of spacer 2600 that may be used to practice the disclosed method previously described. The spacer 2600 has a height 2616 substantially corresponding to the desired bondline thickness 338 (FIG. 27). In this example, the spacer 2600 comprises an outer spacer ring 2602 and an inner spacer ring 2604 connected by circumferentially spaced, radially extending spokes 2606. Although 2 rings 2602, 2604 are shown in the illustrated example, more than 2 rings may be used, depending on the application. It may also be possible to use only a single ring 2602 in some applications.

Each of the rings 2602, 2604 and spokes 2606 have open sides 2612 that allow adhesive (not shown) to freely pass therethrough, both axially as shown by the arrow 2608, and laterally as shown by the arrows 2610. The radial spacing "R" between the rings 2602, 2604 may vary with the application. The spacer 2600 may be constructed of any suitable material, including but not limited to metals and polymers, that provides sufficient structural rigidity such that the spacer 2600 remains substantially non-compressible as pressure is applied to the patch 314 (FIG. 27) during compaction. In the illustrated example, the rings 2602, 2604 as well as the spokes 2606 are formed from wire-like cylindrical elements 2614 of circular cross section, as shown in FIG. 26, however, other shapes are possible. As best seen in FIG. 27, the spacer 2600 provides axial support at multiple locations over the patch 314 which maintains spacing between the patch 314 and the skin panel 312 corresponding to the desired bondline thickness 338 as the patch 314 is being compacted.

Figure 28:
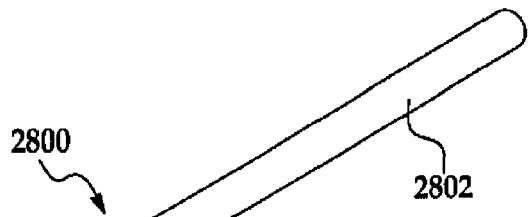
FIG. 28 is an illustration of a perspective view of another embodiment of a spacer.
Figure 29:
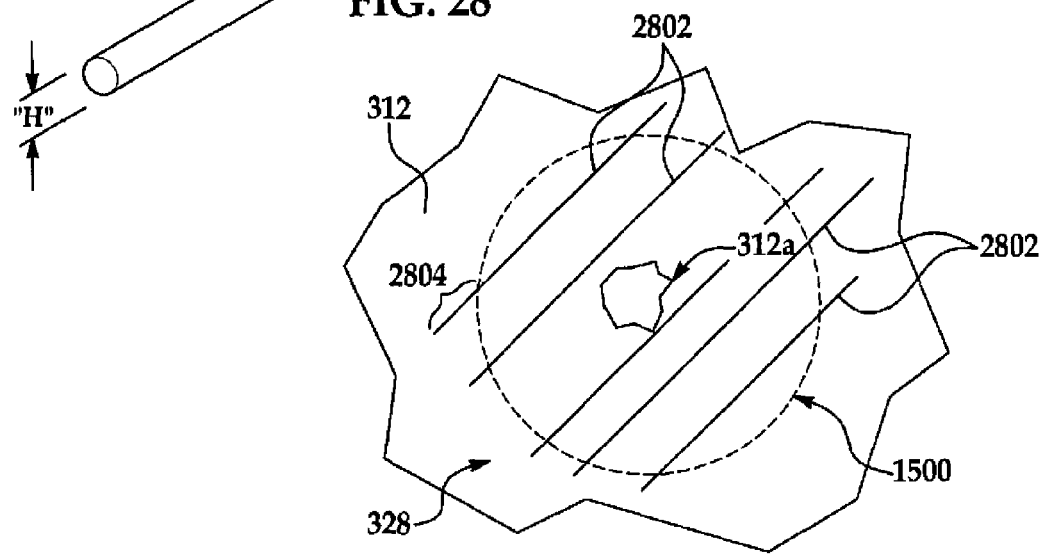
FIG. 29 is an illustration similar to FIG. 15 but showing a plurality of the spacers of FIG. 28 having been placed over the rework area, prior to the application of adhesive.
Figure 30:
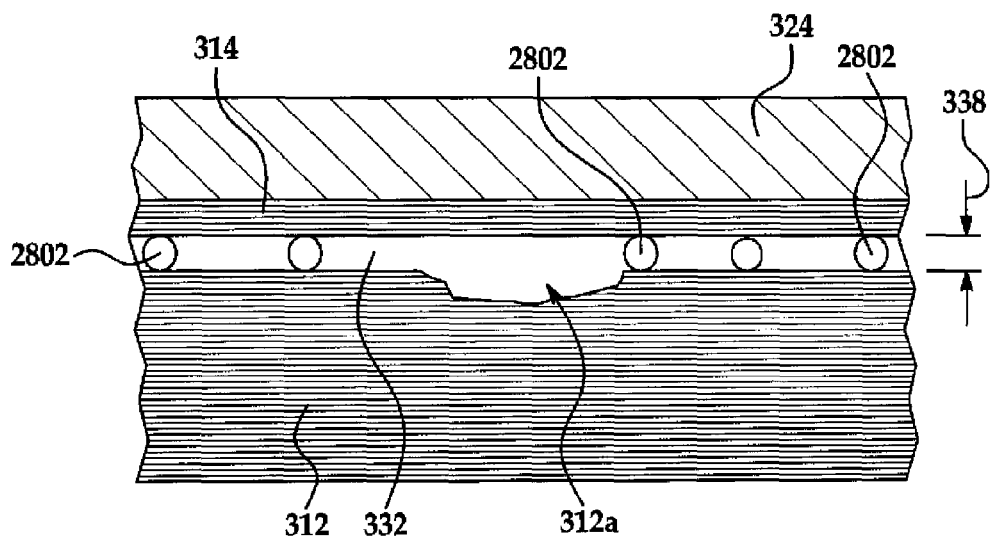
FIG. 30 is an illustration similar to FIG. 27 but showing the use of the spacers of FIG. 28 to maintain bondline thickness.

FIGS. 28, 29 and 30 illustrate another form of spacer 2800 comprising a plurality of individual, elongate spacer elements 2802 each having a height "H" (FIG. 28) substantially corresponding to the bondline thickness 338. The spacer elements 2802 may be flexible and formed of any suitable, substantially non-compressible material, such as, without limitation, a polymer or a metal. For example, the individual spacer elements 2802 may be cut from a length (not shown) of a monofilament fiber. In other embodiments, each of the spacer elements 2802 may comprise multiple filaments or fibers gathered or bundled together by any of several known techniques. For example, the spacer elements 2802 may comprise carbon fiber tows. The individual spacer 2802 may be placed in generally parallel, spaced apart relationship on the skin panel 328 overlying the section 1500 to be reworked. The ends 2804 of each element may be trimmed to size. It may be desirable, however, to trim the ends 2804 of the elements 2802 so that they are spaced inwardly from the outer edge of the rework section 1500. FIG. 30 illustrates the spacer elements 2802 acting a supports interposed between the patch 314 and the skin panel 312 that maintain the desired bondline thickness 338 substantially across the entire area of the patch 314.

Figure 31:
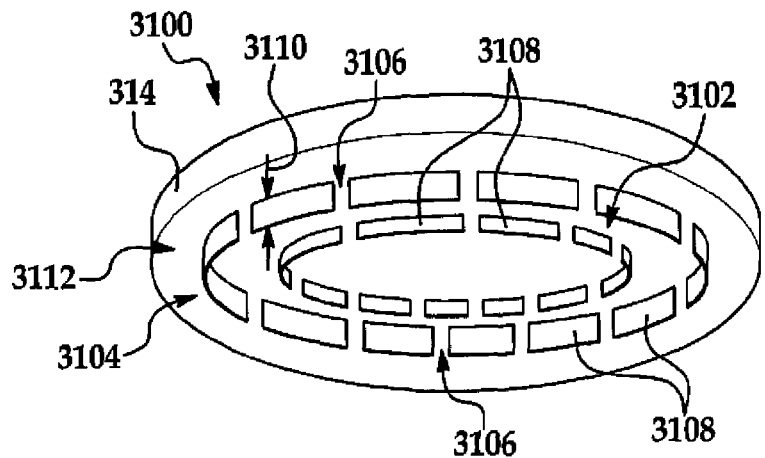
FIG. 31 is an illustration of a perspective view showing the bottom of a patch having another form of spacer.

Attention is now directed to FIG. 31 which illustrates another embodiment of a spacer 3100 which may form an integral part of the patch 314. The spacer 3100 comprises a plurality of circumferentially spaced, curved segments 3108 forming spacer elements arranged in inner and outer rings 3102, 3104 respectively. Each of the segments 3108 has a height 3110 substantially corresponding to the desired bondline thickness 338 (FIG. 30). Spaced apart openings 3106 between the segments allow adhesive to flow laterally across the bottom face 3112 of the patch 314 through the spacer 3100 to achieve a uniform bondline thickness 338 (see FIG. 30). The individual segments 3108 may comprise substantially non-compressible inserts that are placed in the patch 314, or relatively narrow pad-ups integrally formed in the patch 314 in those cases where the patch 314 is formed of composite materials.

Figure 32:
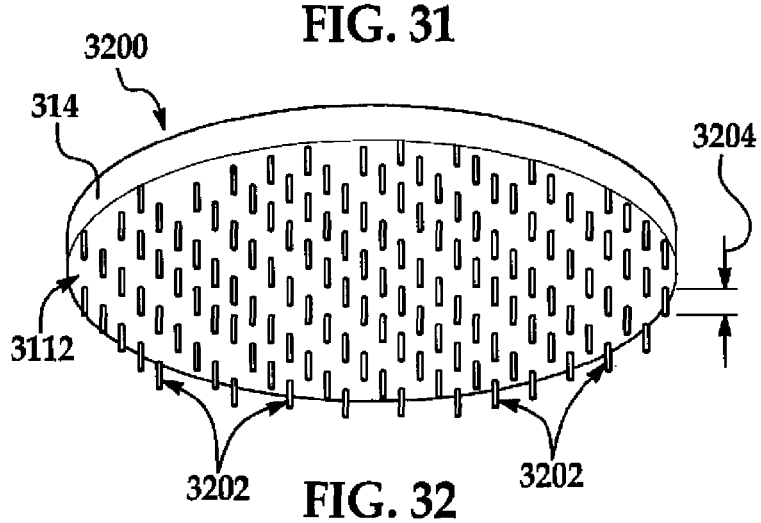
FIG. 32 is an illustration similar to FIG. 31 but showing a further form of spacer.
Figure 33:
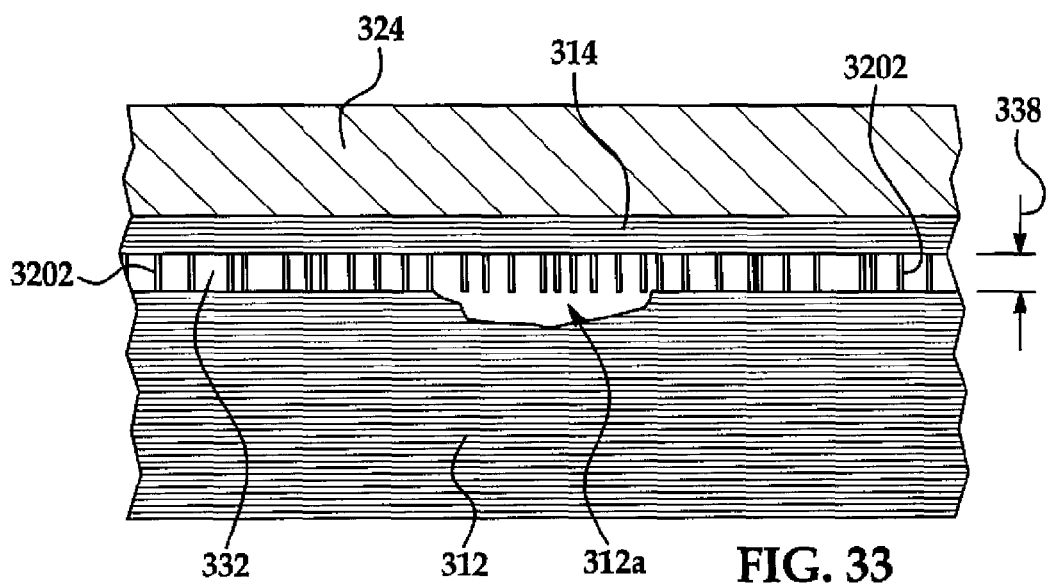
FIG. 33 is an illustration similar to FIG. 30 but showing the use of the spacer of FIG. 32 to maintain bondline thickness.

FIG. 32 illustrates still another embodiment of a spacer 3200 comprising a plurality of spacer elements in the form of substantially non-compressible pins 3202. Each of the pins 3201 has a height 3204 substantially corresponding to the desired bondline thickness 338 (FIG. 30). The pins 3202 may be integrated into the bottom face 3112 of the patch 314 or may be separate from the patch 314. The pins may be distributed across the patch 314 either uniformly or non-uniformly, in either a regular or irregular pattern. FIG. 33 illustrates the use of the pins 3202 as individual spacers interposed between the patch 314 and the skin panel 312 which maintain the desired bondline thickness 338 substantially across the entire area of the patch 314.

Figure 34:
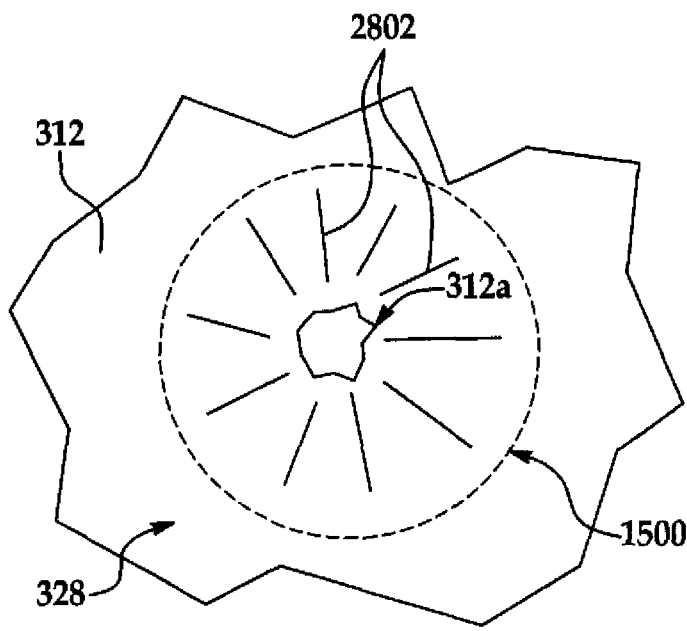
FIG. 34 is an illustration similar to FIG. 29 but showing another embodiment of the spacers.

FIG. 34 illustrates a further embodiment similar to the embodiment of FIGS. 28 and 29, but wherein the spacer elements 2802 are arranged in a radial pattern within the rework area 1500, radiating outwardly from area 312a. In this embodiment, the radial arrangement of the spacer elements 2802 may aid in channeling the movement of excess adhesive (not shown) toward the outer edges of the rework area 1550 during compaction where it may be squeezed out from beneath the patch 314.

Figure 35:
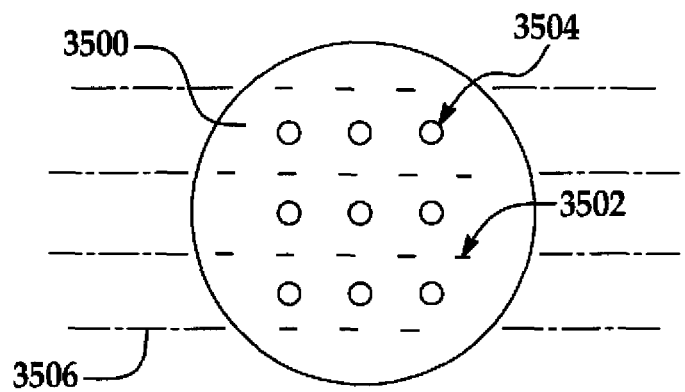
FIG. 35 is an illustration of a plan view of a perforated patch having another form of the spacers applied thereto.

FIG. 35 illustrates another embodiment in which spacer elements 3502 are provided in the form of line shaped protrusions or bumps that may be formed on a composite patch 3500, which optionally, may have a plurality of perforations 3504 therein. The perforations 3504 may allow the escape of air and/or excess adhesive during the compaction process, as previously described in connection with FIG. 18. The spacer elements 3502 may be relatively short and may be roughly aligned along parallel, spaced apart axes 3506 extending between the perforations 3504. The distance between the spacer elements 3502, their length and their orientation may vary depending on the application. In some applications, the spacer elements 3502 may not be aligned and may be randomly oriented. The spacer elements 3502 in FIG. 35 may comprise an epoxy resin that is molded into the patch 3500, or may be carbon or glass fibers (tows) reinforced polymer that is cocured with the patch 3500. The spacer elements 3502 may comprise other fiber materials such as prepreg tows each formed of many small diameter monofilament fibers. The spacer elements 3502 shown in FIG. 35 may be employed on a patch not having the perforations 3504.

Figure 36:
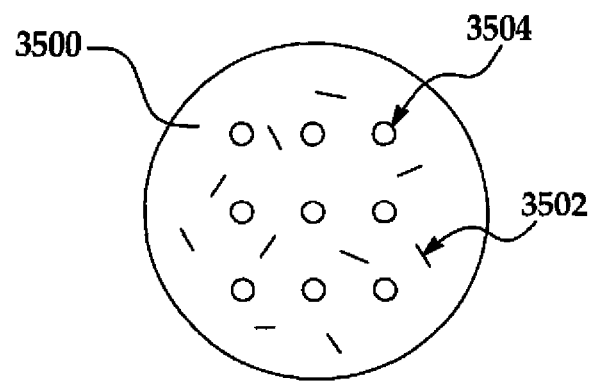
FIG. 36 is an illustration similar to FIG. 35 but showing a different layout of the spacers on the perforated patch.

FIG. 36 shows still another embodiment of a perforated patch 3500 similar to that illustrated in FIG. 35, but showing the spacer elements 3502 as having random orientations. The line-like spacer elements 3502 may comprise uncured protrusion material such as a carbon of glass fiber reinforced polymer that is cocured with the patch 3500 when patch 35500 is bonded to another structure (not shown).

Figure 37:
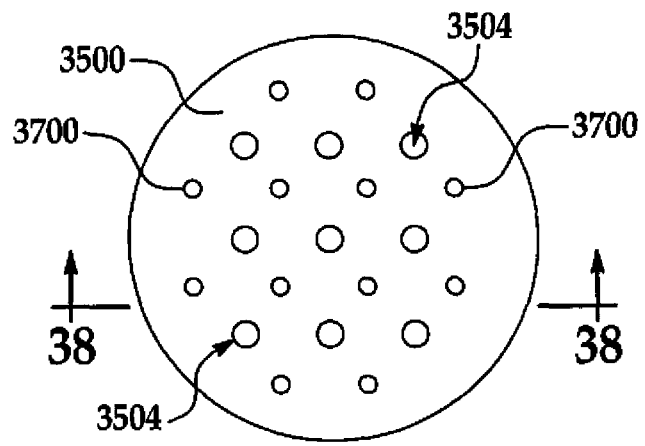
FIG. 37 is an illustration of a plan view of a perforated patch having another form of the spacers formed thereon.
Figure 38:
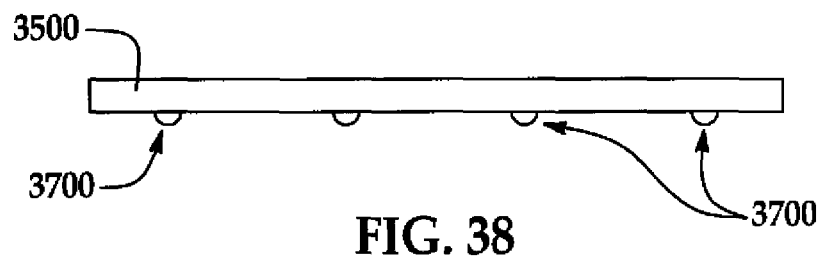
FIG. 38 is an illustration of a sectional view taken along the line 38-38 in FIG. 37; and, FIG. 39 is an illustration of a plan view of a perforated patch having another form of the spacers formed thereon.

Attention is now directed to FIG. 37 which illustrates a perforated patch 3500 having spacer elements in the form of protrusion bumps 3700 distributed across the face of the patch 3500. In this embodiment, the spacer elements 3700 may comprise beads that are partially embedded in the patch 3500 and then cured with the patch 3500. Alternatively, the spacer elements 3700 may comprise short lengths of a chopped carbon fiber reinforced polymer that is cocured with the patch 3500, or which are tacked in an uncured state to the patch 3500 and then cocured with the adhesive used to bond the patch 3500 to a structure. While the bumps 3700 are illustrated as having a rounded geometry in the drawings, other geometries are possible such as, without limitation, a truncated cone (not shown).

Figure 39:
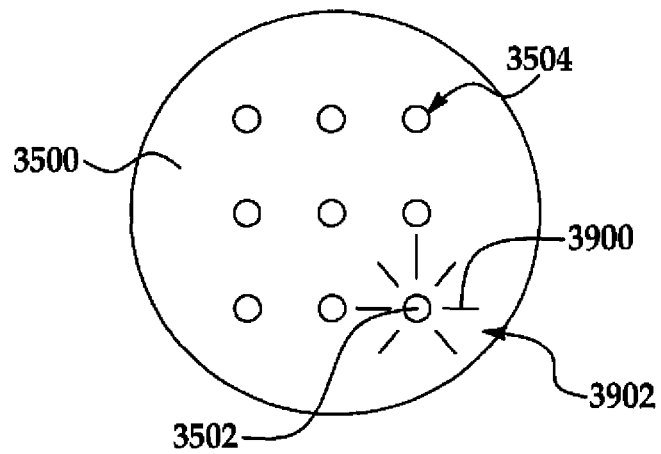

FIG. 39 illustrates still another embodiment in which line-like spacer elements 3900 similar to those described with reference to FIGS. 35 and 36 are arranged in a sunburst-like pattern 3902 (only one of which is shown in FIG. 39 for clarity) around each of the perforations 3504. The radial arrangement of the spacer elements 3900 around the perforations 3504 may aid in directing the movement of excess adhesive toward the perforations 3504 where the adhesive may squeezed out from beneath the patch 3500 during the compaction process.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of platforms.

For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object. For example, the different advantageous embodiments may be suitable for bonding wood parts for objects, such as a building, a boat, and/or some other object that includes wood parts.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed:

1. A method of reworking an area of a structure, comprising:
    placing a spacer over the area, the spacer comprising a screen, the screen having a thickness substantially the same as diameters of a plurality of beads, the screen further comprising openings sized to allow the plurality of beads to pass through the openings; and
    thereafter placing a layer of adhesive and the plurality of beads on the spacer;
    placing a patch over the spacer such that the layer of adhesive is between the spacer and the patch.

2. The method of claim 1, wherein: the layer of adhesive and the plurality of beads move through the spacer to the area.

3. The method of claim 1, further comprising:
    compacting the patch against the layer of adhesive, wherein the plurality of beads limits compaction of the layer of adhesive as the patch is compacted against the layer of adhesive.

4. The method of claim 3, further comprising:
    placing an anti-caul plate around a periphery of the patch, the anti-caul plate surrounding an entirety of the patch; and
    wherein compacting the patch comprises compacting using a caul plate covering the entirety of the patch and also covering at least a portion of the anti-caul plate.

5. The method of claim 3, further comprising:
    removing excess adhesive from the patch.

6. The method of claim 3, further comprising:
    preparing the patch, including forming a plurality of perforations in the patch that allow escape of air from beneath the patch as the patch is compacted.

7. The method of claim 3, further comprising:
    limiting pressure applied to peripheral portions of the patch as the patch is being compacted.

8. The method of claim 1, wherein said patch is applied to conform to a surface of said structure adjacent said layer of adhesive.

9. The method of claim 8, wherein the surface of said structure comprises at least one of a curve, a contour, a depression, and a deformation.

10. The method of claim 9, wherein said patch comprises at least one of curves, contours, and tapers.

11. A method of bonding a patch on structure, comprising:
    applying a layer of adhesive to an area of the structure;
    placing a spacer on the area of the structure, the spacer comprising both a plurality of beads and a screen, the screen having a first thickness substantially the same as diameters of the plurality of beads, the screen further comprising openings sized to allow the plurality of beads to pass through the openings;
    using the spacer to control a second thickness of the layer of adhesive, the layer of adhesive extending over substantially an entirety of the area;
    following placing the spacer, placing a patch on the spacer and over the area; and
    compacting the patch against the layer of adhesive.

12. The method of claim 11, further comprising:
    removing excess adhesive from the patch.

13. The method of claim 11, further comprising:
    curing the layer of adhesive.

14. The method of claim 11, wherein the second thickness of the layer of adhesive is uniform.

15. The method of claim 11, further comprising:
    placing an anti-caul plate around a periphery of the patch, the anti-caul plate surrounding an entirety of the patch; and
    wherein compacting the patch comprises compacting using a caul plate covering the entirety of the patch and also covering at least a portion of the anti-caul plate.

16. A method of reworking a composite aircraft structure in the field, comprising:
    preparing an area of the structure to be reworked;
    forming a patch including forming perforations in the patch;
    applying a layer of adhesive and a plurality of beads to the area such that said layer of adhesive extends over substantially an entirety of the area;

placing a spacer on the area, the spacer comprising a screen, the screen having a first thickness substantially the same as diameters of the plurality of beads, the screen further comprising openings sized to allow the plurality of beads to pass through the openings;
using the spacer to control a second thickness of the layer of adhesive to be about the first thickness of the screen;
removing the spacer, wherein beads of the plurality of beads maintain the second thickness of the layer of adhesive;
applying the patch to the structure over the beads;
removing excess adhesive from the patch;
thereafter placing a caul plate over the patch;
placing an anti-caul plate between the caul plate and the structure such that said anti-caul plate surrounds an outer periphery of said patch;
installing a pressure applicator over the combination of the patch, the caul plate, and the anti-caul plate;
using the pressure applicator to apply pressure to the patch through the caul plate, wherein the anti-caul plate limits the pressure at the periphery of the patch;
installing a heat pack over the patch; and
using the heat pack to cure the layer of adhesive.

\* \* \* \* \*